(12) United States Patent
Stone

(10) Patent No.: US 7,086,369 B2
(45) Date of Patent: Aug. 8, 2006

(54) INTEGRATED POWER TRANSMISSION DRIVE AND METHOD

(75) Inventor: Roger D. Stone, West Sussex (GB)

(73) Assignee: The Gates Corporation, Denver, CO (US)

( * ) Notice: Subject to any disclaimer, the term of this patent is extended or adjusted under 35 U.S.C. 154(b) by 452 days.

(21) Appl. No.: 09/877,617

(22) Filed: Jun. 8, 2001

(65) Prior Publication Data

US 2002/0023616 A1 Feb. 28, 2002

Related U.S. Application Data

(60) Provisional application No. 60/210,199, filed on Jun. 8, 2000.

(51) Int. Cl.
*F02F 7/00* (2006.01)

(52) U.S. Cl. .............................. 123/195 R; 123/90.15

(58) Field of Classification Search ............ 123/195 R, 123/90.15, 198 R; 29/888.01, 888.1
See application file for complete search history.

(56) References Cited

U.S. PATENT DOCUMENTS

| | | | |
|---|---|---|---|
| 1,647,434 A | 11/1927 | Chorlton | |
| 2,303,093 A | 11/1942 | Schreck | 123/195 |
| 3,263,663 A | 8/1966 | Connell | 123/195 |
| 3,603,296 A | 9/1971 | Mitchell | 123/41.46 |
| 3,951,123 A | 4/1976 | Hill | 123/195 A |
| 4,257,370 A | 3/1981 | Kasting | 123/198 E |
| 4,321,896 A | 3/1982 | Kasting | 123/195 A |
| 4,607,601 A | 8/1986 | Kohler | 123/90.31 |
| 4,697,782 A | 10/1987 | Ban | 248/639 |
| 4,998,515 A | 3/1991 | Carvalho | 123/195 C |
| 5,000,142 A | 3/1991 | Aruga et al. | 123/195 C |
| 5,125,376 A | 6/1992 | Williams et al. | 123/195 A |
| 5,131,889 A | 7/1992 | Meckstroth et al. | 474/117 |
| 5,588,325 A * | 12/1996 | Green et al. | 74/15.63 |
| 5,692,466 A | 12/1997 | Hausmann et al. | 123/195 A |
| 5,704,329 A | 1/1998 | Bublitz et al. | 123/195 A |
| 6,101,995 A | 8/2000 | Itoh et al. | 123/195 A |
| 6,167,782 B1 | 1/2001 | Chevalier | 74/574 |
| 6,244,239 B1 | 6/2001 | Sisco et al. | 123/198 R |
| 6,752,235 B1 * | 6/2004 | Bell et al. | 180/360 |

FOREIGN PATENT DOCUMENTS

| | | |
|---|---|---|
| DE | 23 54 992 A1 | 7/1980 |
| DE | 49 25 126 A1 | 2/1992 |
| DE | 195 03 105 C1 | 4/1996 |
| DE | 197 32 270 A1 | 2/1999 |
| EP | 0 124 433 A2 | 11/1884 |
| JP | 11-294178 | 10/1999 |

* cited by examiner

*Primary Examiner*—Tony M. Argenbright
*Assistant Examiner*—Katrina Harris
(74) *Attorney, Agent, or Firm*—J.L. Mahurin, Esq.; C.H. Castleman, Esq.; J.A. Thurnau, Esq.

(57) ABSTRACT

The invention is an improved power transmission drive, for an internal combustion engine. The drive is of the type having a flexible link medium for transmitting power between a crankshaft of said internal combustion engine and drive components not associated with a primary purpose of the internal combustion engine. The drive is improved by the inclusion of a drive frame, a camshaft sprocket releasably mounted upon the drive frame, a crankshaft drive-wheel releasably mounted upon the drive frame, an engine accessory mounted upon the drive frame, an accessory drive-wheel mounted upon a shaft of the engine accessory, and the camshaft sprocket, the crankshaft drive-wheel, and the accessory drive-wheel each entrained by the flexible link medium.

9 Claims, 20 Drawing Sheets

INTEGRATED POWER TRANSMISSION DRIVE AND METHOD

CROSS-REFERENCE TO RELATED APPLICATIONS

This application claims priority to U.S. Provisional Patent Application Ser. No. 60/210,199 filed Jun. 8, 2000 and entitled INTEGRATED POWER TRANSMISSION DRIVE AND METHOD. The subject matter of this application is incorporated herein by this reference.

BACKGROUND OF THE INVENTION

1. Field of the Invention

This invention relates generally to flexible link power transmission drives associated with internal combustion engine camshafts and accessories and the mounting therefor. More particularly, this invention relates to the integration of these flexible link drives to facilitate improved space efficiency and improved engine assembly. Specifically, this invention relates to integrating the flexible link power transmission drives and accessories associated with automotive internal combustion engines into a unit separable from an associated engine and a method for its use.

2. Description of the Prior Art

Internal combustion engines commonly require a portion of the mechanical power, available at their crankshafts, to be transmitted to devices not associated with primary purposes of the engines. Such primary purposes include providing the motive force for a vehicle or supplying power to be converted to electrical or hydraulic power in stationary applications. Some of these devices are commonly referred to as engine accessories or auxiliaries. Among these accessories are devices that perform functions necessary for the sustained operation of the engine. These include oil pumps to supply engine oil pressure, fuel pumps to pressurize the fuel supplied to carburetor or fuel injection systems, superchargers to increase manifold pressure, magnetos, generators or alternators to supply ignition spark, and water pumps to cause the circulation of coolant through engine cooling systems.

There are also accessories that perform functions not associated with either primary purposes of the engines or sustained operation of the engines. Examples of these include power steering pumps to pressurize power assisted steering units, generators or alternators to provide electrical power for vehicle electrical systems, not including ignition systems, vacuum pumps for the distribution of power to certain vehicle systems, and air conditioning compressors.

The crankshaft's mechanical power frequently must also be tapped to operate valves that control the flow of engine gases. Typically this includes the synchronous transmission of power from the crankshaft to one or more camshafts, which causes the valves to operate in a timed manner.

For all but the simplest of engines, either gear driven or flexible link driven power transmission systems have been used to power engine accessories and valve trains. Flexible link power transmission systems include those incorporating asynchronous power transmission belting, synchronous power transmission belting, and chain.

Gear driven systems, or gear trains, allow limited flexibility in the layout of the drive and in the geometrical relationships of the accessories, the camshafts, and the crankshafts, to each other. The gears must be held in strict relationship to each other, in terms of axial alignment and separation, and planar alignment. Also, there is a limited overall geometry available for varying the arrangement of power takeoff points in relation to the crankshaft. Gear trains also tend to generate excessive unwanted noise. Further, such gear trains generally require access to engine lubrication. However, gear trains can be capable of delivering substantial power over a wide range of rotational speeds. Accordingly, gear trains have found their greatest acceptance for use in large heavy-duty engine applications, especially of the compression ignition type, such as for large trucks.

Such a gear train generally requires multiple idler gears which must also be mounted on the engine, thereby further complicating the problem of providing proper support and drive to the valve train and engine accessories. Due to the rotational speed at which the engine valve trains and accessories must be driven and the rather high torque requirements of such valve trains and accessories, the individual gears making up the drive train must be of high precision. The performance capability of such high quality gearing may not be fully realized unless each gear making up the drive train is very carefully positioned to provide proper gear lash between the meshing gear teeth. Failure to achieve optimum gear lash can result in severe damage to the gear teeth requiring a costly and time-consuming overhaul of the gear train.

Attempts to accommodate the above noted limitations and requirements have spawned a variety of mounting approaches. For example, in some engines, the accessory drive gears are mounted directly on the engine cylinder block. However, mounting the gears directly on the cylinder block requires the machining of bores in the block to receive the shafts of the accessory and idler gears. Further, these bores must be precisely spaced relative to the crankshaft, the camshaft and each other. An error in machining even one bore could result in an unusable cylinder block, which must be discarded at considerable expense. Even when the bores are positioned correctly, separate alignment apparatus is required to achieve proper gear lash.

Another approach is to build a framework upon which to mount all of the gears of a gear train, including the crankshaft gear, the accessory gears, and the camshaft gear and to assemble all of these as a unit. The unit may then be mounted upon the cylinder block. This allows the assembly and maintenance of the gears in the strict relationships required and eliminates the need to precision machine bores directly in the cylinder block. Gear shaft receiving bores must still be positioned precisely on the framework. However, if a machining error is made only the framework is rendered unusable. The cost to the manufacturer of discarding an incorrectly bored framework is significantly less than the cost of discarding an incorrectly bored engine cylinder block.

Further, the piecemeal removal and replacement of accessories and their associated gears is highly impractical due to the gear train requirements described above. This has led to the mounting of certain accessories upon the framework. U.S. Pat. No. 1,647,434, to Chorlton describes such an arrangement.

Flexible link power transmission systems driving accessories and valve trains are not faced with these limitations and requirements. The need for precision placement of idler gears, drive gears, or accessories is greatly reduced. The accessories and camshafts can be placed over a substantially wider range of locations. The lack of gear train precision requirements makes piecemeal removal and replacement of accessories feasible. Also, flexible link transmissions, particularly those employing power transmission belting, tend to be quieter.

These qualities have led to flexible link power transmissions, to predominate in driving accessories and valve trains, in automotive engine applications. Currently, the most common set-up is for each accessory to be mounted upon separate mounting points or brackets, upon the engine cylinder block or cylinder head. Then, one or more asynchronous power transmission belts span from a crankshaft drive-wheel to each drive-wheel associated with each accessory. The drive-wheels associated with asynchronous power transmission belts are pulleys or sheaves. It is also common for tensioners to be mounted separately upon the cylinder blocks to provide tension upon the belts to facilitate proper operation of the power transmission drives.

Commonly, the camshafts are placed in the cylinder heads of the engines. A drive-wheel is attached to the camshaft. An additional flexible link then spans from a crankshaft drive-wheel to the camshaft drive-wheel. Due to the need for synchronous operation of the camshaft with the crankshaft, the flexible link will be either a synchronous power transmission belt or a chain. In either event, the drive-wheels for both the crankshaft and the camshaft are sprockets. As with the accessory drives, the camshaft drives also employee tensioners mounted directly upon the cylinder blocks or heads to tension the flexible links to facilitate proper operation of the drives. Generally, a flexible link camshaft drive is enshrouded by the cooperation of a front face of the engine and a front engine cover. This protects the drive from certain environmental influences, such as dirt, debris, and water.

A substitute for mounting each accessory upon separate brackets has been to include mounting points for accessories as part of the front cover. U.S. Pat. No. 5,692,466 to Hausmann et al. describes such an approach. This approach is stated to have the advantages that: 1) the accessory support brackets usually used can be omitted resulting in a reduction of cost and weight; 2) it provides mounting stiffness resulting in good reaction force transmission to the accessories; 3) the resonance frequency of the camshaft drive cover is increased which greatly reduces vibration of the accessories and decreases engine noise during engine operation; and, 4) the cast structure for the front face of the engine cylinder block is simplified. Hausmann does not mention or suggest that the accessories can be first mounted upon the cover, followed by mounting the combination of the cover and accessories being mounted upon the cylinder block.

Yet another approach has been to provide a unitary mounting bracket for the engine accessories. Some portion of all accessories associated with any given engine are collected and mounted upon the bracket. The bracket and those accessories are then mounted as a unit upon the engine's cylinder block. The pulley for the crankshaft is mounted upon the crankshaft in a separate operation. Once these are completed, then the power transmission belt is installed about the pulleys. This approach apparently sought to derive the benefits of an improved assembly method whereby the number of steps necessary to the operation of a main assembly line were reduced and of a reduced inventory list.

However, none of these approaches individually, or in combination, have realized the full benefits available to a highly integrated flexible link power transmission system, of the present invention. Those benefits include a further reduction in the number of main assembly line steps and an additional reduction of inventory parts. Importantly, the present invention provides the opportunity for improved control over the alignment of the drive-wheels, giving rise to improved noise and wear characteristics for the flexible link. This improved control also provides the opportunity to tighten dimensional tolerances and thus provide more compact drives. Synchronous drives require clean and, in the case of chain drives, well-lubricated environments to produce satisfactory results. The present invention provides the further benefit of allowing improved encapsulation of the synchronous portion of the drive, associated with the camshaft, and thereby reducing the intrusion of foreign matter and the leakage of lubricant.

All of these benefits are very desirable to the automotive manufacturers. They cut assembly costs. They allow the power plant to be smaller, which in turn allows a smaller engine compartment, which can be traded for more interior room for a given size automobile. The resulting noise and wear reduction leads to improved consumer perception of quality and acceptance, and reduced warranty returns.

Accordingly, there remains the need for a highly integrated flexible link power transmission system that incorporates an engine drive frame whereupon: all or substantially all accessories, including associated drive-wheels, are pre-assembled; all other drive-wheels are affixed in preparation for final mounting upon the engine; the accessory drive or drives are configured including placement of the flexible links upon the drive-wheels; the camshaft drive, whether separate from or part of the accessory drive, are configured including placement of the flexible link about the sprockets; and where improved environmental protection to the camshaft drive is provided.

SUMMARY OF THE INVENTION

The present invention has as an object the provision of a flexible link power transmission system that provides a reduction in the number of main assembly line steps and a reduction of inventory parts.

The present invention has the further object of providing the opportunity for improved control over the alignment of the drive-wheels, giving rise to improved noise and wear characteristics for the flexible link and more compact drives.

The present invention has the further object of allowing improved encapsulation of the synchronous portion of the drive, associated with the camshaft.

To achieve the foregoing and other objects in accordance with the purpose of the present invention, as embodied and broadly described herein, an integrated power transmission drive and method is disclosed herein. The invention is an improved power transmission drive, for an internal combustion engine. The drive is of the type having a flexible link medium for transmitting power between a crankshaft of the internal combustion engine and drive components not associated with a primary purpose of the internal combustion engine. The drive is improved by the inclusion of a drive frame, a camshaft sprocket releasably mounted upon the drive frame, a crankshaft drive-wheel releasably mounted upon the drive frame, an engine accessory mounted upon the drive frame, an accessory drive-wheel mounted upon a shaft of the engine accessory, and the camshaft sprocket, the crankshaft drive-wheel, and the accessory drive-wheel each entrained by the flexible link medium.

BRIEF DESCRIPTION OF THE DRAWINGS

The accompanying drawings, which are incorporated in and form part of the specification in which like numerals designate like parts, illustrate preferred embodiments of the present invention and together with the description, serve to explain the principals of the invention. In the drawings.

DETAILED DESCRIPTION OF THE PREFERRED EMBODIMENT

Figure 1:
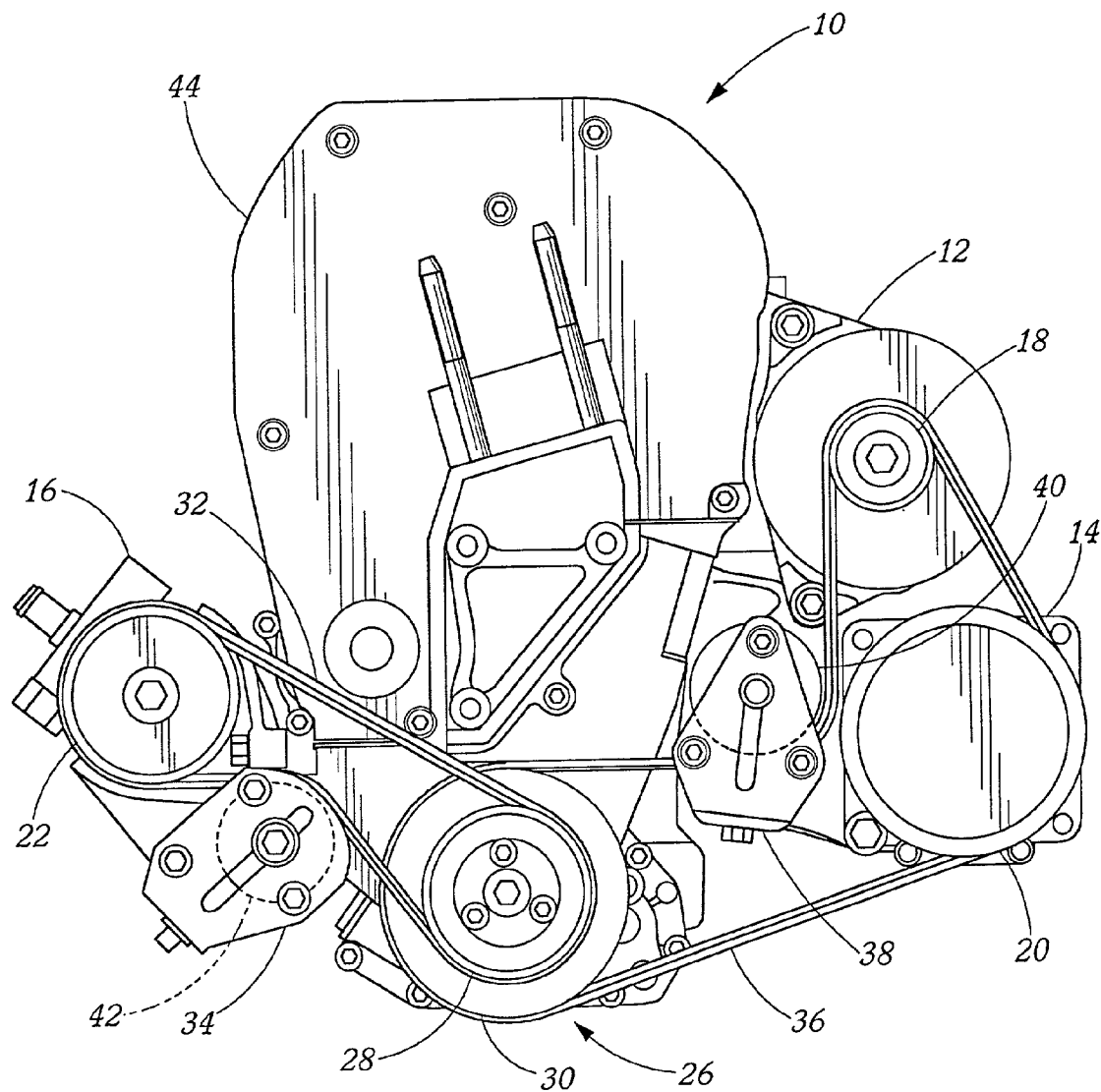
FIG. 1 depicts a prior art accessory drive configuration.

A configuration now commonly found for accessory drives is depicted on FIG. 1. An in-line four cylinder internal combustion engine 10 is shown from the front with accessories attached. The accessories include alternator 12, air conditioning compressor 14, and power steering pump 16. An alternator-starter or generator-starter can also be used in place of alternator 12. Associated with each of the accessories are alternator pulley 18, air conditioning pulley 20, and power steering pump pulley 22, respectively. The crankshaft 24 (FIG. 2) has a pulley 26, with first pulley portion 28 and second pulley portion 30, mounted thereupon. First tensioner 34 biases first tensioner pulley 42 against first power transmission belt 32. The first power transmission belt 32 is trained about, or circumjacent to, power steering pump pulley 22, first pulley portion 28, and first tensioner pulley 42. First belt 32 is deflected by first tensioner pulley 42, and is thereby tensioned upon pulleys 22 and 26. A second tensioner 38 biases second tensioner pulley 40 to deflect second power transmission belt 36. Said second belt 36 is trained about pulleys 18, 20, and 40 and second pulley portion 30. First and second belts 32 and 36 are asynchronous, and commonly of the v-ribbed type. Also depicted is engine front cover 44.

Figure 2:
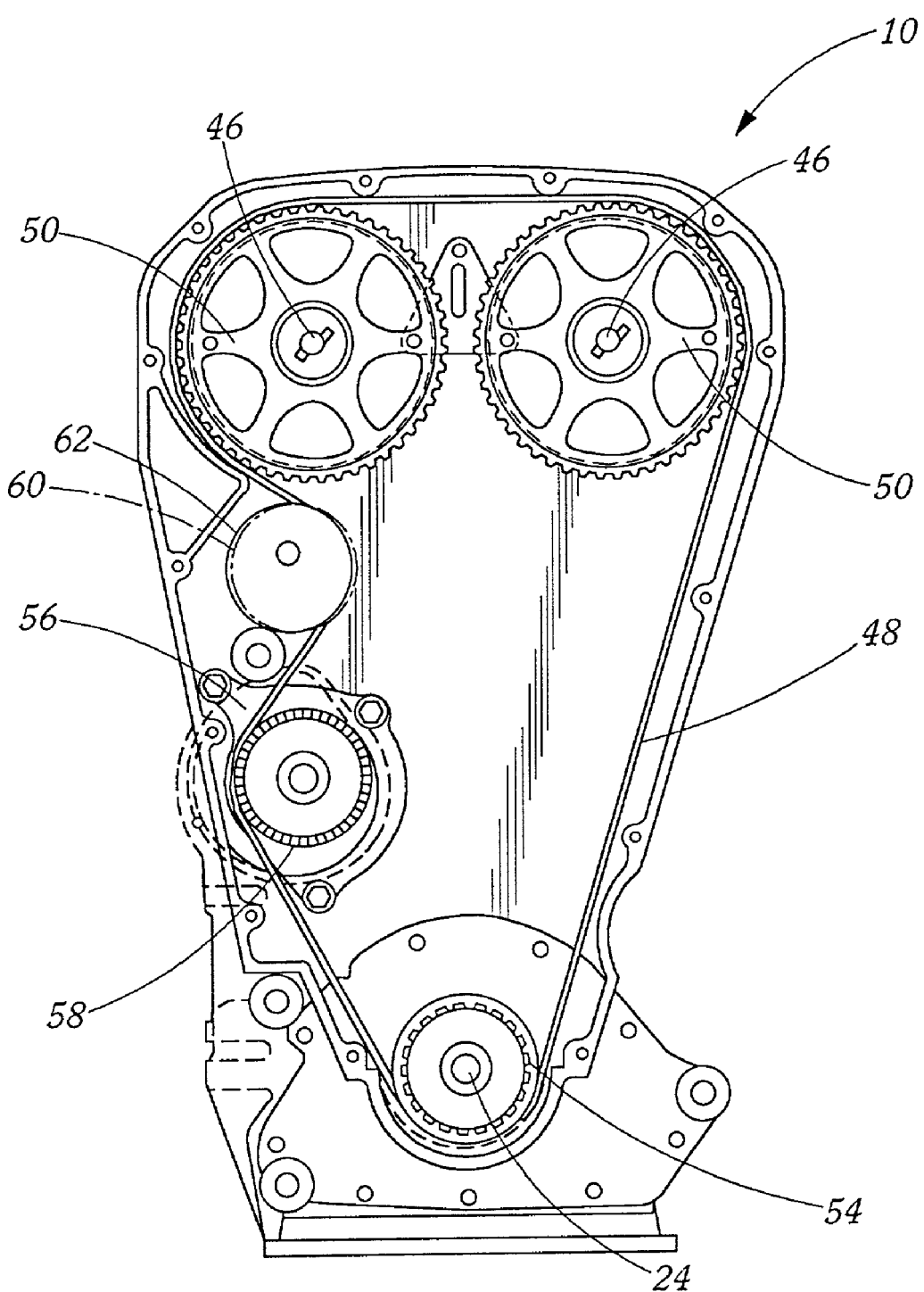
FIG. 2 depicts a prior art dual overhead cam drive system.

A common dual overhead cam drive system is depicted in FIG. 2. Internal combustion engine 10 is shown to have two camshafts 46. Upon the camshafts are sprockets 50. Crankshaft 24 has crankshaft sprocket 54 mounted thereupon. In addition to driving the camshafts, the system depicted also drives water pump 56 via associated water pump sprocket 58. The system is tensioned by synchronous tensioner 60 biasing synchronous tensioner pulley 62 against synchronous power transmission belt 48.

Today's common assembly practice is for camshaft sprockets 50, synchronous tensioner 60 (including pulley 62), water pump 56 (including sprocket 58) and crankshaft sprocket 54 to be assembled upon engine 10 when it arrives at the appointed station or stations on the main assembly line. Later on the main assembly line, the synchronous power transmission belt 48 is trained about sprockets 50, 54, and 58, and pulley 62. Front engine cover 44 is sealingly placed upon engine 10. Still on the main assembly line, crankshaft pulley 26, alternator 12, air conditioning compressor 14, power steering pump 16, first tensioner 34, and second tensioner 38, are mounted upon engine 10. Alternator 12, air conditioning compressor 14, power steering pump 16, first tensioner 34, and second tensioner 38 are normally pre-equipped with associated pulleys 18, 20, 22, 42, and 40, respectively. After all of the foregoing, power transmission belts 32 and 36 are trained about or placed circumjacent to pulleys 18, 20, 22, 26, 40, and 42.

The instant invention eliminates most or all of these assembly steps from the main assembly line with the benefits of improving reliability of the most critical assembly path in the manufacture of automobiles and of reducing overall assembly cost by placing these steps into, one or more, less critical assembly paths. It does so through the provision of an engine drive frame, or an enhanced front engine cover, adapted to fulfill many functions, in a single article of manufacture that forms part of a drive system module, which heretofore have been spread over numerous other parts and pieces. Further, it performs functions, to make assembly processes more cost efficient, previously unavailable, including the releasable and/or rotatable mounting upon the frame, of drive-wheels such as pulleys, sheaves, synchronous belt or chain sprockets or even drive-wheels with a combination of these characteristics.

Figure 3:
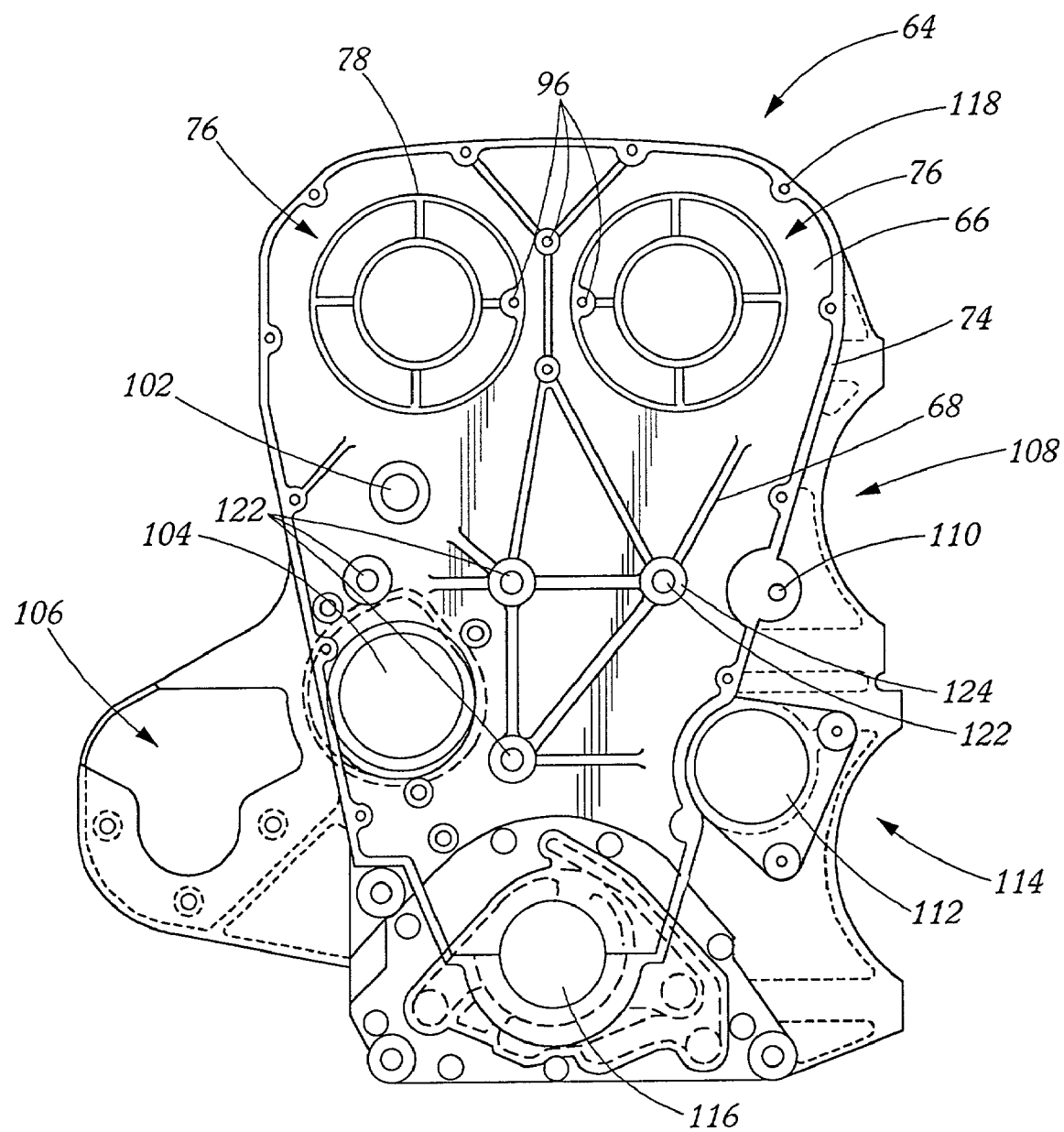
FIG. 3 is an elevation of the engine drive module frame.
Figure 4:
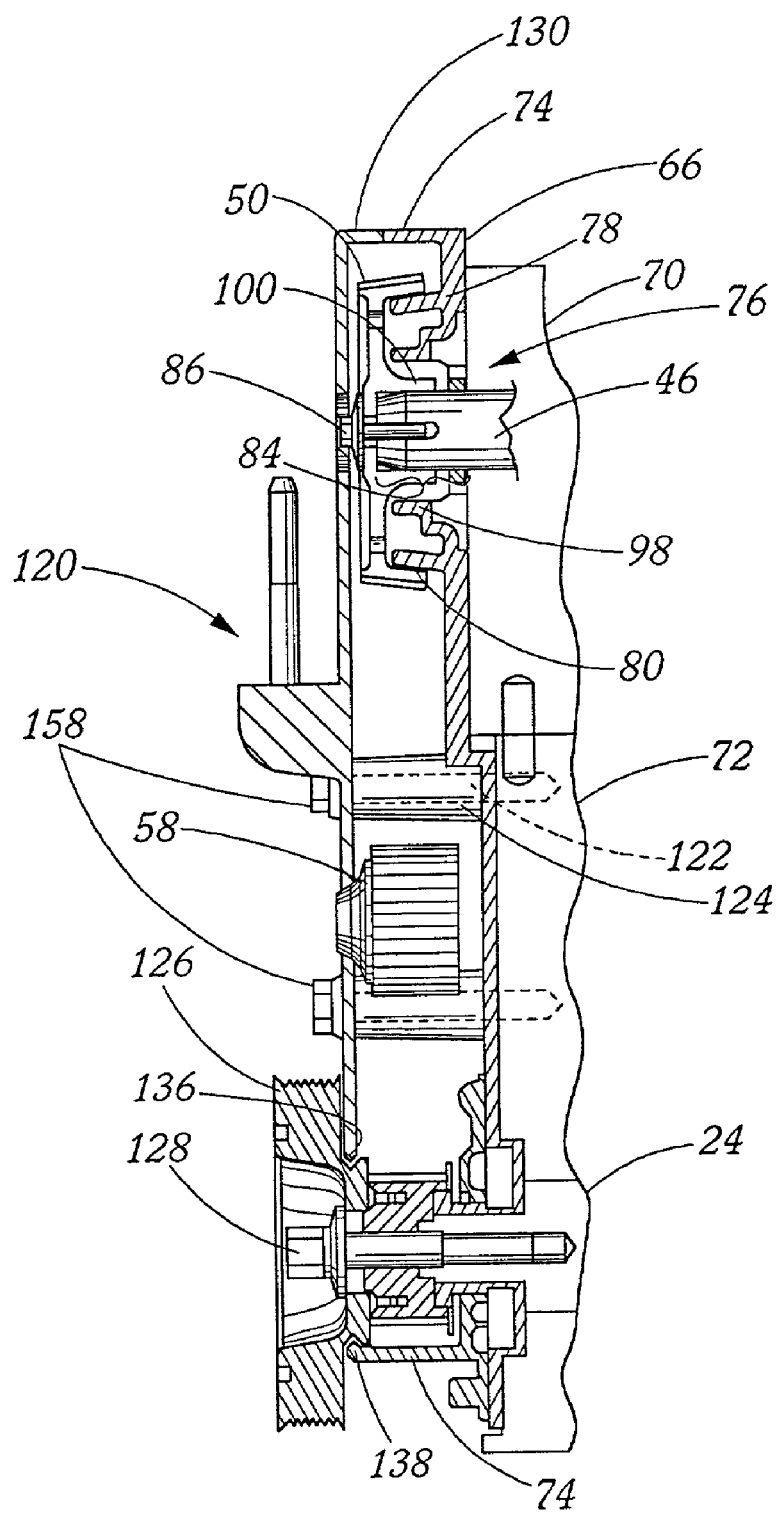
FIG. 4 is a section on the line 4—4 of FIG. 7.

Referring to FIGS. 3 and 4, the frame 64 of a preferred embodiment is depicted schematically. In general form, it comprises a base plate 66 reinforced by stiffeners 68. The actual configuration of stiffeners 68 will vary according to the specific application. Perimeter wall 74 extends from a substantial portion of the perimeter of base plate 66 and in substantial conformance to the shape of the front of engine 10, specifically the front shape of the combination of cylinder head 70 and cylinder block 72. The shape of base plate 66 accommodates the shape of the front of engine 10 to create a mating relationship between base plate 66 and the front of engine 10. Frame 64 includes receiving areas for mounting or otherwise receiving accessories, tensioners, drive-wheels, and engine shafts. There are camshaft and sprocket receiving areas 76. Attachment ends 84 of camshafts 46 protrude through these areas when frame 64 is mounted upon engine 10. The outer perimeters of camshaft and sprocket receiving areas 76 are sprocket retainers 78. As can more clearly be seen in FIGS. 4 and 6, retainers 78 are hollow frustums whose outer surfaces 80 correspond closely to the inside surfaces 82 of camshaft sprockets 50. This correspondence creates a releasable fit, whereby camshaft sprockets 50 can be lightly pressed upon retainers 78 and held in place awaiting assembly of the completed module upon engine 10. After sprockets 50 have been releasably mounted upon retainers 78, the act of mounting frame 64 upon engine 10 presses attachment ends 84 into mating relationship with sprockets 50 and forces sprockets 50 to be released from retainers 78. The tightening of fastener 86 completes the mounting of camshaft sprockets 50 upon camshafts 46.

As mentioned, retainers 78 in this preferred embodiment are of the form of hollow frustums. Other shapes and techniques, while not depicted, are also envisioned. They include segmented hollow frustums, posts, or pins adapted to either wholly or partially mate-up with inside surfaces 82. Outer surfaces 80 of each of the retainers mentioned can include notches, ridges or other textures adapted to cooperate with inside surfaces 82 to modify the forces required to release sprockets 50 from retainers 78. Likewise, inside surfaces 82 can be textured for the same purpose. Adhesive can be added between surfaces 80 and 82. Further, adhesive can be placed between sprocket 50 and base plate 66 at a point of contact between them to form retainer 78.

Figure 5:
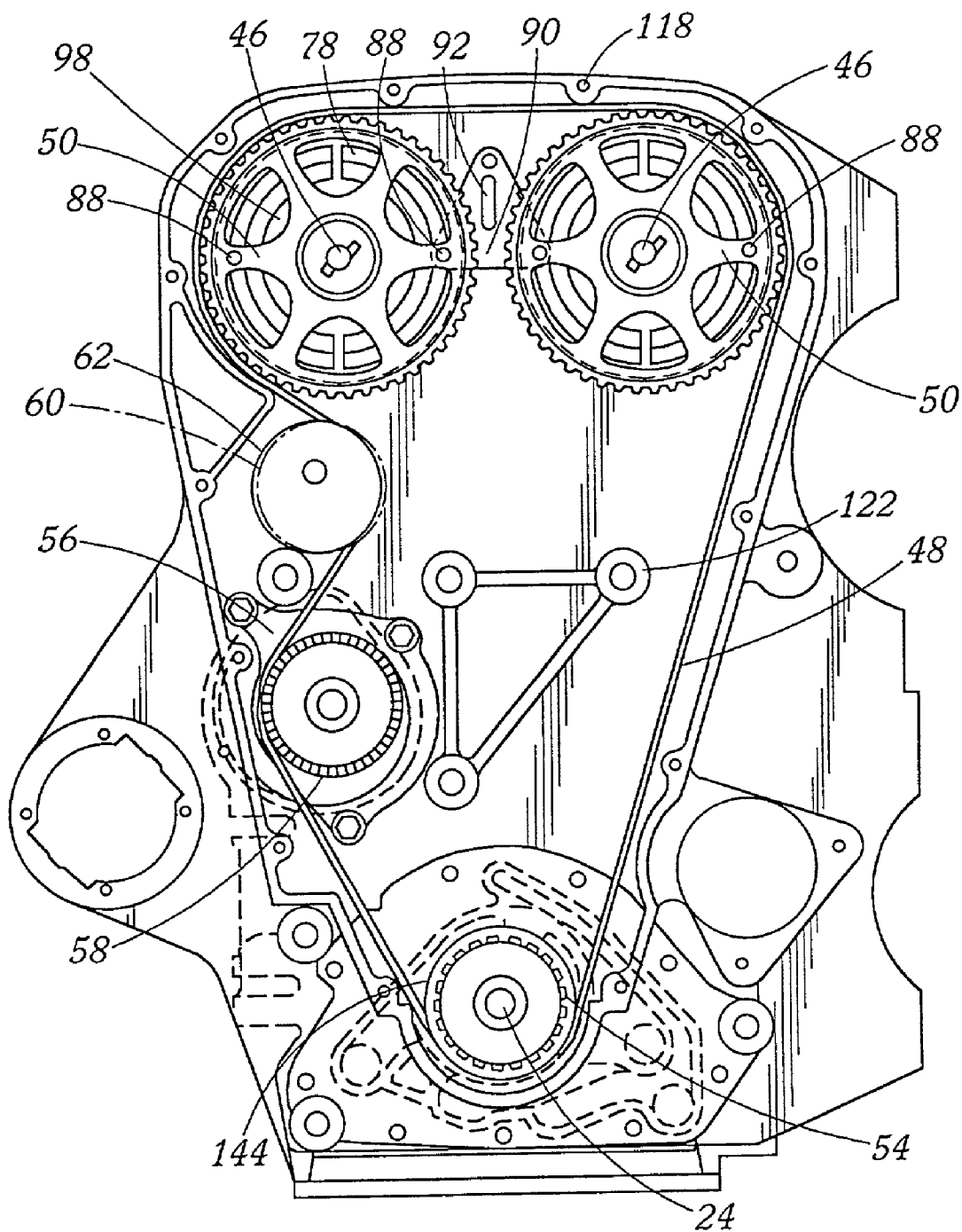
FIG. 5 is an elevation of the engine drive module frame showing the camshaft drive.
Figure 6:
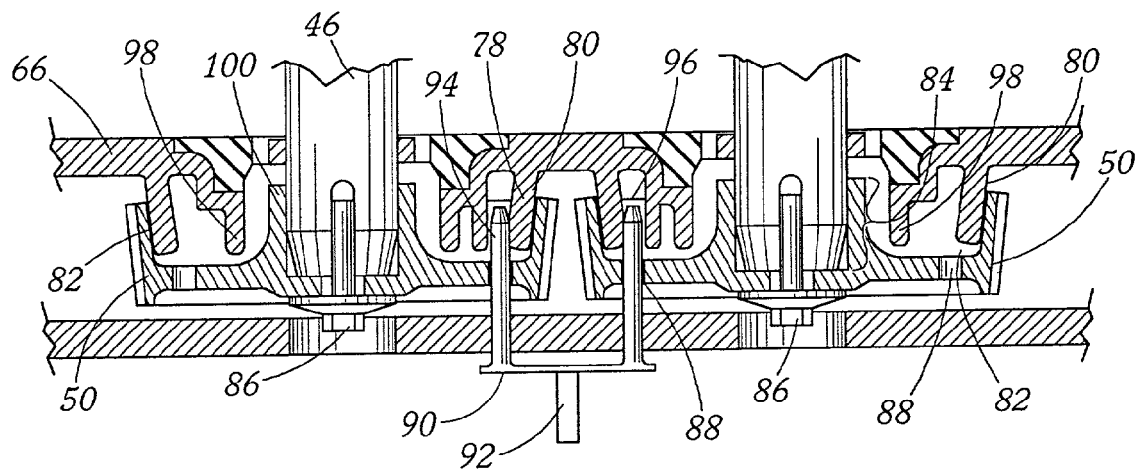
FIG. 6 is a detail depicting the camshaft sprocket indexed.
Figure 12:
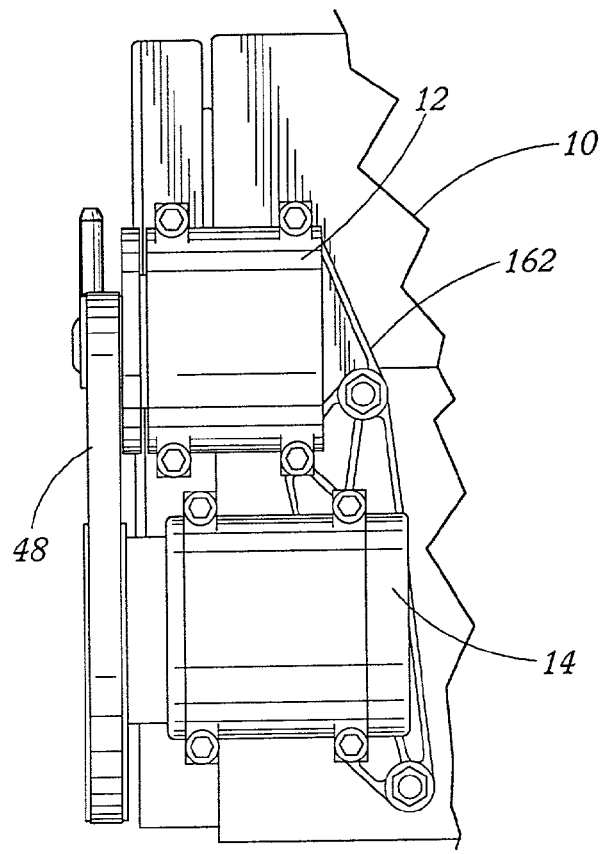
FIG. 12 is a side elevation of the installation of a supplemental bracket.

FIGS. 5 and 6 depict alignment holes 88 on camshaft sprockets 50. As shown, this preferred embodiment includes alignment clip 90 having handle 92 and alignment pins 94. Integral to sprocket retainer 50 are pin receivers 96. When cam sprockets 50 are releasably mounted upon sprocket retainers 78 and alignment clip 90 is placed with alignment pins 94 through alignment holes 88 and inserted into pin receivers 96, rotational orientation of camshaft sprockets 50 becomes fixed. The rotational relationship of crankshaft 24 and camshafts 46 are critical to the proper operation of engine 10. The fixing of camshaft sprockets 50 upon frame 64, in conjunction with the keying of camshaft sprockets 50 with camshafts 46 establishes a point of reference by which crankshaft 24 and crankshaft sprocket 54 can be rotationally aligned to establish the critical relationship between camshafts 46 and crankshaft 24.

An additional approach, not depicted, that both releasably retains camshaft sprockets 50 and fixes their rotational orientation is to incorporate additional pin receivers 96 in alignment with alignment holes 88 not used in the described preferred embodiment. Then all four pin receivers 96 can be threaded. The final step is to screw fasteners through alignment holes 88 and into pin receivers 96, leaving the fasteners loose enough to allow camshaft sprockets 50 to seek proper axial alignment upon their mounting on camshafts 46. After the frame 64 is mounted upon engine 10, the fasteners can be removed to release camshaft sprockets 50.

It is contemplated that alignment holes 88 can be eliminated by the use of a simple molded device that simply slips into the gap between the two cam sprockets 50 and engages the teeth of cam sprockets 50. This approach does not apply to single cam engines.

It is also contemplated that camshaft sprockets 50 can be rotatably retained by journaling camshaft sprocket 50 at the interfaces of journal supports 98 and camshaft sprocket hubs 100. This configuration still uses alignment clip 90 to fix rotational orientation of camshaft sprockets 50. For such an embodiment, sprocket retainers 78 are absent and the journaling must be loose to accommodate some lateral movement of cam sprocket 50 when being separably mounted upon camshaft 46.

Referring to FIG. 3, frame 64 also includes synchronous tensioner mounting point 102, water pump mounting point 104, power steering pump mounting point 106, alternator mounting point 108, idler mounting point 110, serpentine belt tensioner mounting point 112, air conditioner compressor mounting point 114, and crankshaft receiving area 116. A plurality of mounting holes 118 are located along perimeter wall 74 for fastening cam drive cover 130, depicted on FIGS. 7 and 8, to frame 64. This preferred embodiment includes motor mounting bracket 120 for supporting engine 10 from the front. Accordingly, stiffening posts 122 with pass-through holes 124 are provided to strengthen the connection between engine 10 and motor mounting bracket 120. However, many applications will not include mounting bracket 120.

Figure 13:
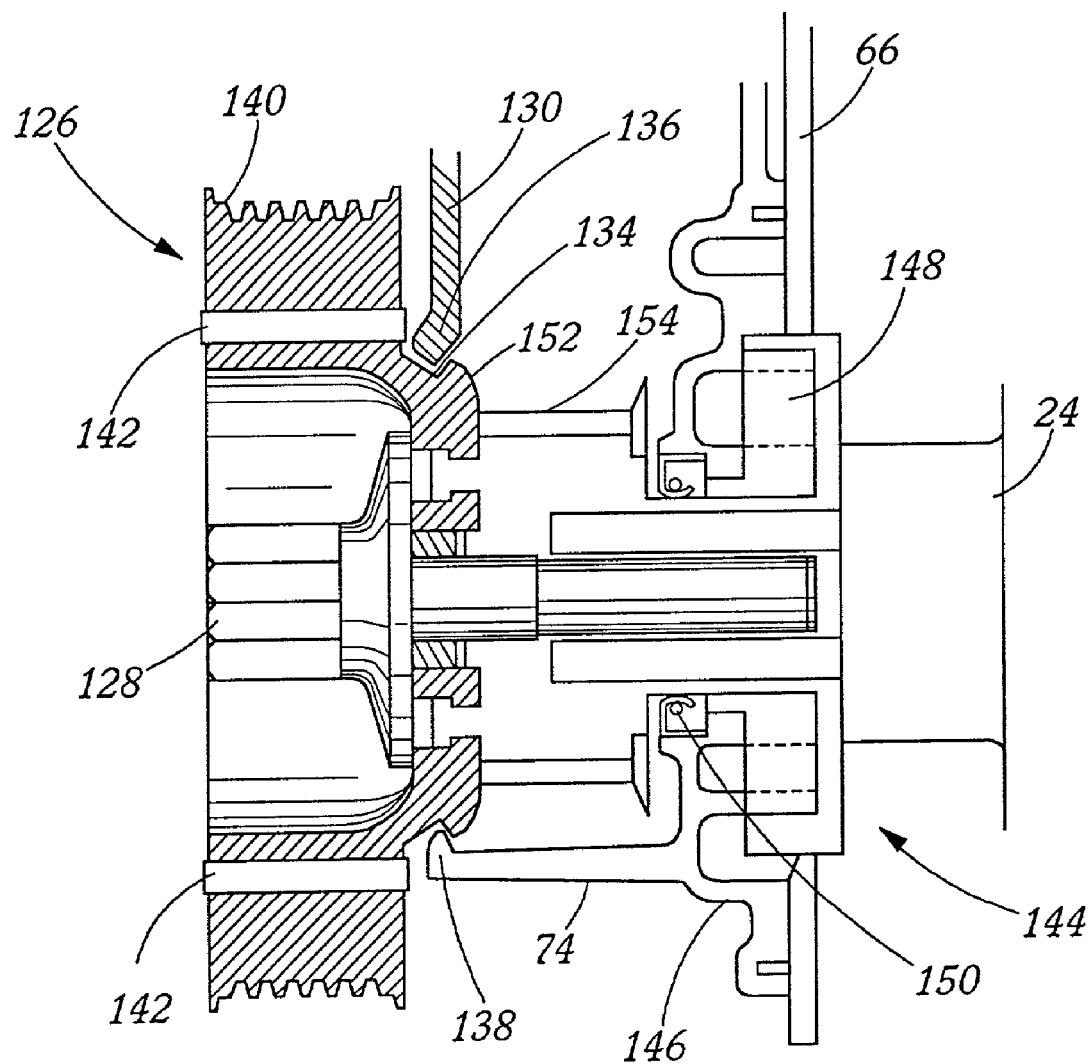
FIG. 13 is a detail of the crankshaft drive wheel including a torsional vibration damper assembled on the drive frame and the crankshaft.

Referring to FIG. 13, the releasable mounting configuration of crankshaft pulley 126 is depicted. Pulley hub 132 has retaining groove 134 that encircles hub 132 near the point of contact between hub 132 and crankshaft sprocket 54. Groove 134 cooperates with first protrusion 136 formed on the lower portion of cam drive cover 130 and second protrusion 138 formed on a portion of perimeter wall 74 proximate groove 134, to loosely hold pulley 126 in place. For certain application, first protrusion 136 will adequately retain crankshaft pulley 126, eliminating the need for second protrusion 138. In the depicted preferred embodiment, of this figure, pulley 126 is a torsional vibration damper. Thus, pulley 126 includes inertia ring 140 and rubber insert 142.

In the depicted embodiment, the engine oil pump 144 is affixed to base plate 66. Pump 144 includes pump body 146 and pump rotor 148. Rotor 148 is driven directly by crankshaft 24, and is in mechanical communication with the synchronous camshaft drive including synchronous power transmission belt 48, camshaft sprockets 50, crankshaft sprocket 54, synchronous tensioner 60, synchronous tensioner pulley 62, water pump 56, and water pump sprocket 58. Water pump sprocket 58 can also be a pulley driven by the other side of belt 48. Further, water pump 56 can be alternately driven by asynchronous power transmission belt 98, or directly driven in a manner similar to the depicted oil pump 144. Likewise, the oil pump 144 can be driven by the synchronous power transmission belt 49 or the asynchronous power transmission belt 98. Crankshaft nose oil seal 150 seals the interface of pump body 146 and sprocket 54.

In practice frame 64 is provided. Camshaft sprockets 50 are releasably or rotatably mounted at camshaft sprocket receiving areas 76 as previously described. Water pump 56 and associated sprocket 58 are mounted at water pump mounting point 104. Synchronous tensioner 60 and associated pulley 62 are mounted at synchronous tensioner mounting point 102. Oil pump 144 is mounted at crankshaft receiving area 116. For applications requiring synchronous fuel pump operation, such as for compression ignition engines, the fuel pump can be mounted on base plate 66 at an appropriate location to be driven by synchronous power transmission belt 48. The combination of crankshaft pulley 126 and crankshaft sprocket 54 are provided. These can be separately supplied items or an integral unit.

Additionally, it is contemplated that the asynchronous drive can include more than one asynchronous power transmission belt, depending upon the application. In this preferred embodiment, both synchronous power transmission belt 48 and asynchronous power transmission belt 98, form part of a flexible link power transmission medium. For those applications requiring more than one synchronous or more than one asynchronous power transmission belt, all such belts form the flexible link power transmission medium. Where any of the foregoing belts are replaced by chain, the chain, or the chain and belt combination form the flexible link power transmission medium.

Figure 7:
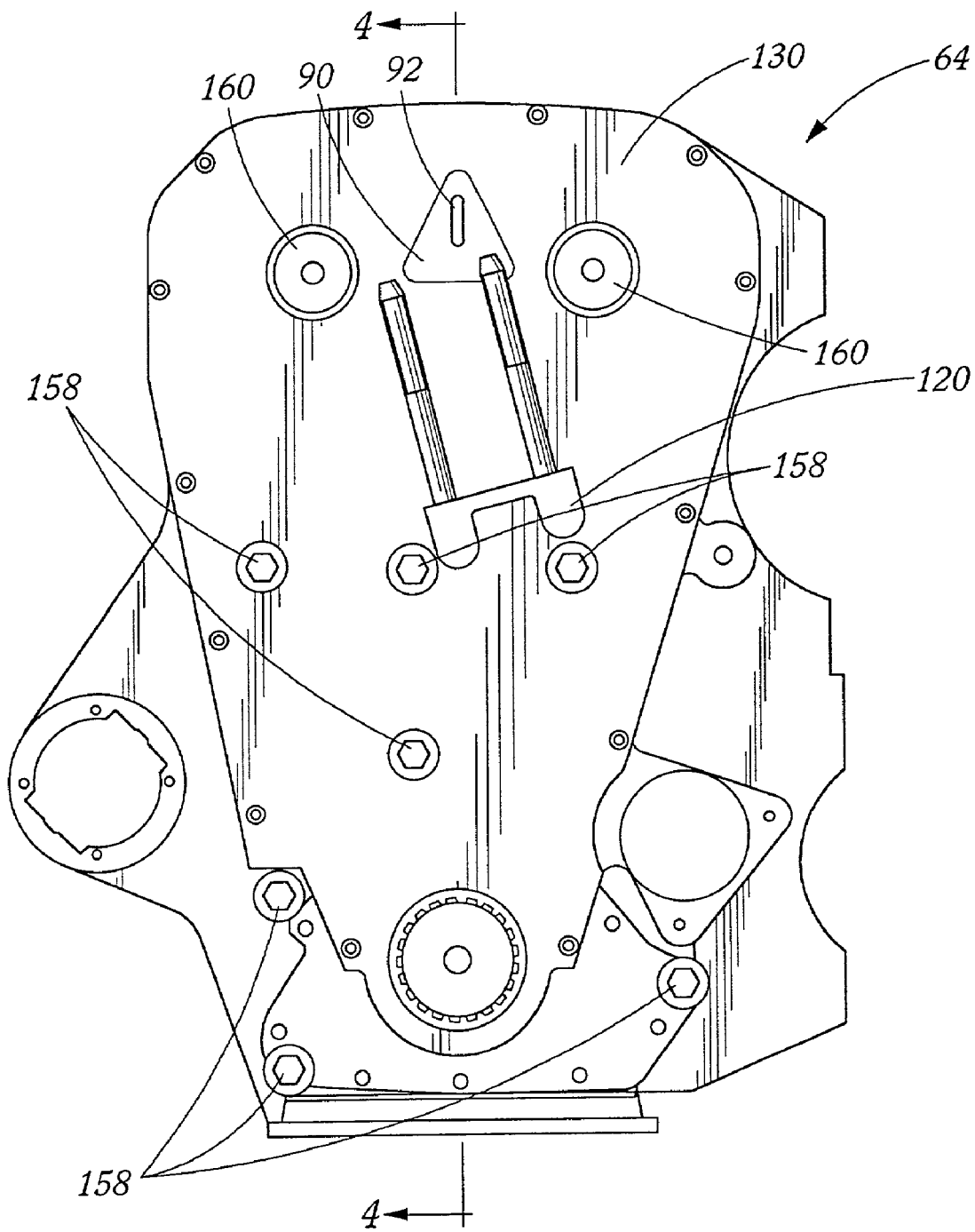
FIG. 7 is an elevation of the engine drive module frame with camshaft drive cover installed.

Synchronous power transmission belt 48 is provided and trained about sprockets 50, 54, and 58, and pulley 62. Alignment clip 90 is inserted through alignment holes 88 and pin receivers 96. When camshaft sprockets 50 are rotationally fixed by insertion of clip 90, as described above, training of synchronous power transmission belt 48 rotationally fixes crankshaft sprocket 54. Retaining groove 134 is matched to second protrusion 138. Cam drive cover 130 is then fitted upon frame 64 at perimeter wall 74. Initially, first protrusion 136 is matched to retaining groove 134. This results in cam drive cover 130 being angled toward retaining groove 134. This act captures pulley 126 and sprocket 54 between first and second protrusions 136 and 138, respectively. Cam drive cover 130 is then mated with perimeter wall 74 and fastened thereto by fasteners (not depicted) being inserted and tightened into frame mounting holes 118. This stage of assembly is depicted in FIG. 7.

Alternator 12, air conditioning compressor 14, power steering pump 16 are supplied with associated pulleys 18, 20, and 22, respectively, mounted thereon. Serpentine belt tensioner 152 and pulley 154, and idler pulley 156 are also supplied. Each are mounted at mounting points 108, 114, 106, 112, and 110, respectively. Asynchronous power transmission belt 48 is then trained about pulleys 18, 20, 126, 22, and 154 with serpentine belt tensioner 152 cocked to allow placement of belt 48.

Figure 8:
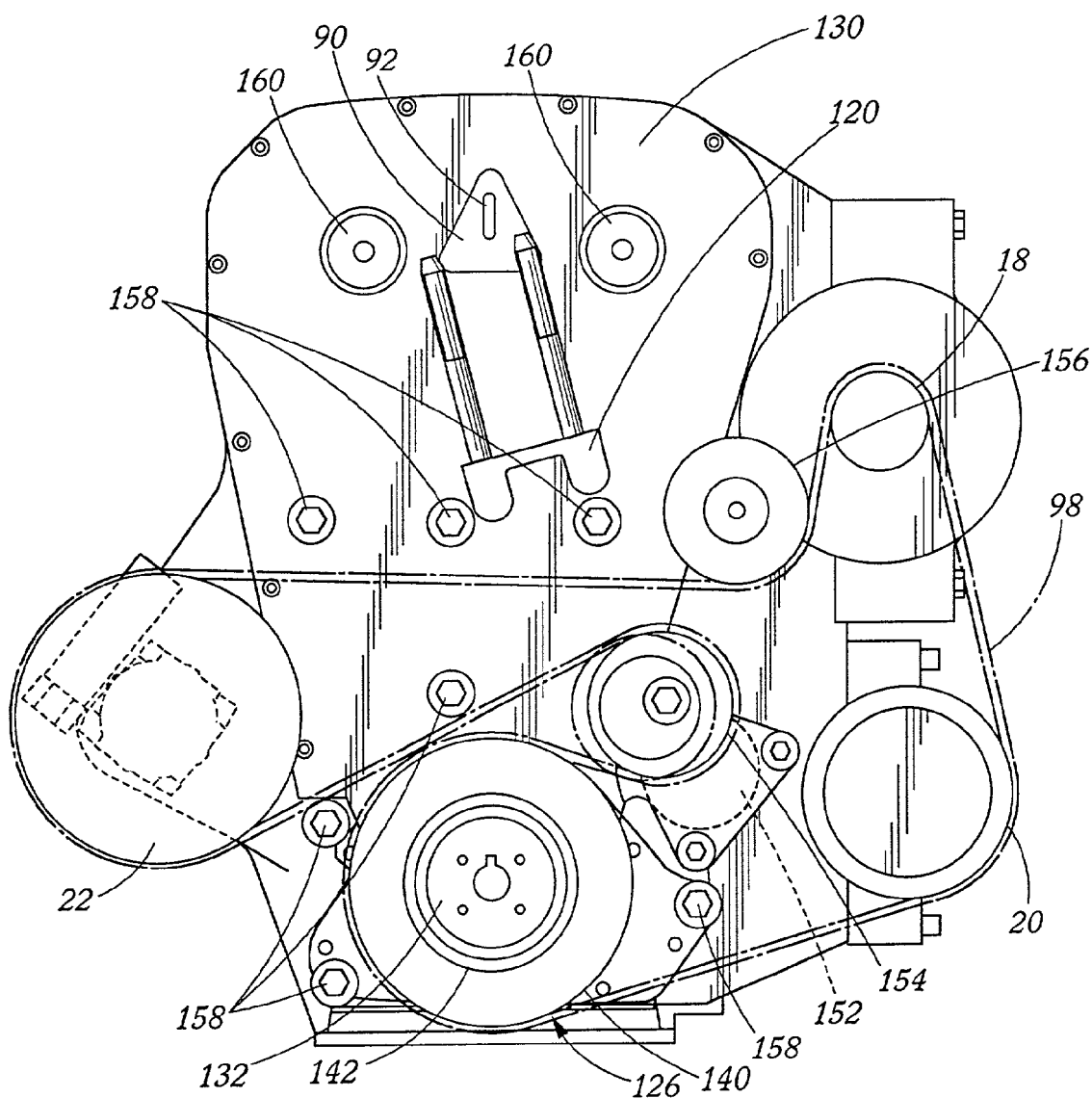
FIG. 8 is an elevation of the engine drive module frame with camshaft drive cover and accessories installed.
Figure 9:
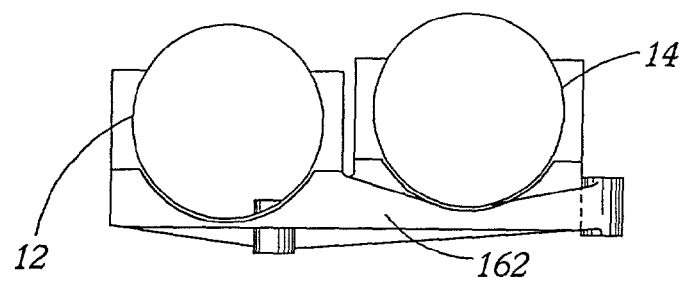
FIG. 9 is a rear elevation of the installation of a supplemental bracket.
Figure 10:
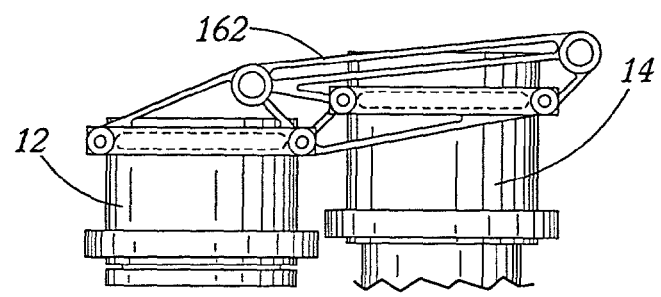
FIG. 10 is a side elevation of the installation of a supplemental bracket.
Figure 11:
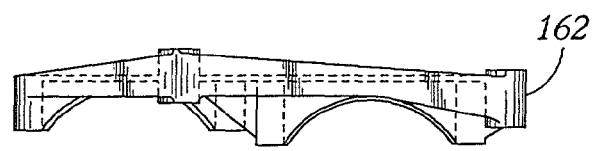
FIG. 11 is a side elevation of the supplemental bracket.

The assembled drive module is depicted in FIG. 8. It is now in condition to be mounted upon engine 10, as a unit. It is affixed to engine 10 by insertion of mounting bolts 158 through holes 122 and tightening into matching threaded holes (not depicted) in cylinder block 72. Cam sprocket fasteners 86 and crankshaft mounting bolt 128 are inserted and tightened. Camshaft fastener access plugs 160 are placed in cam drive cover 130 over fasteners 86. Alignment clip 90 is removed.

Everything except mounting of drive module 52 to engine 10 will ordinarily occur in an assembly line other than the main automotive assembly line. Only affixing drive module 52 to engine 10 will normally be completed on either an engine assembly line or the main automotive assembly line.

In the preferred embodiment, the tightening of fasteners 86 and removal of clip 90 lifts camshaft sprockets 50 off of sprocket retainers 78 and allows camshaft sprockets 50 to rotate in concert with camshafts 46. Tightening of crankshaft mounting bolt 128 lifts retaining groove 134 away from first and second protrusions 136 and 138, allowing crankshaft pulley 126 and crankshaft sprocket 54 to rotate in concert with crankshaft 24. Tensioner 152 is then released to its operating position. The tensioner 152 can only be released after drive module 52 is separably mounted on engine 10, otherwise crankshaft pulley 126 will be loaded and pulled over into a jammed position, which will prevent assembly.

The drive module 52 is now separably affixed to engine 10. That is, by removing fasteners 86, and bolts 128 and 158, the drive module 52 and all of its constituent part can be separated from engine 10. This is true whether sprockets 50 or 54 or pulley 126 are each releasably or rotatably mounted.

It is contemplated that for certain applications additional support of accessories may be required. FIGS. 9 through 12 depict supplemental bracket 162. Bracket 162 is placed between accessories 12 and 14, and engine 10, and bolted to each.

To this point, mounting of drive module 52 to the front of engine 10 has been discussed. It is contemplated that various mounting locations on engine 10 can be accommodated depending upon the configuration of engine 10 and associated power take-off points and accessories. Drive module 52 is also applicable to various internal combustion engine applications beyond automotive. These include those for trucks, off-road equipment, aircraft, and stationary power sources applications.

A chain can be used in place of synchronous power transmission belt 48. In such a case, sprockets 50 and 54 would be shaped appropriately for chain and synchronous tensioner 60 would commonly include a slide in place of pulley 62. A chain can also replace asynchronous power transmission belt 98. In such instance, sprockets would also replace pulleys 18, 20, 22, 126, 154, and 156.

Figure 14:
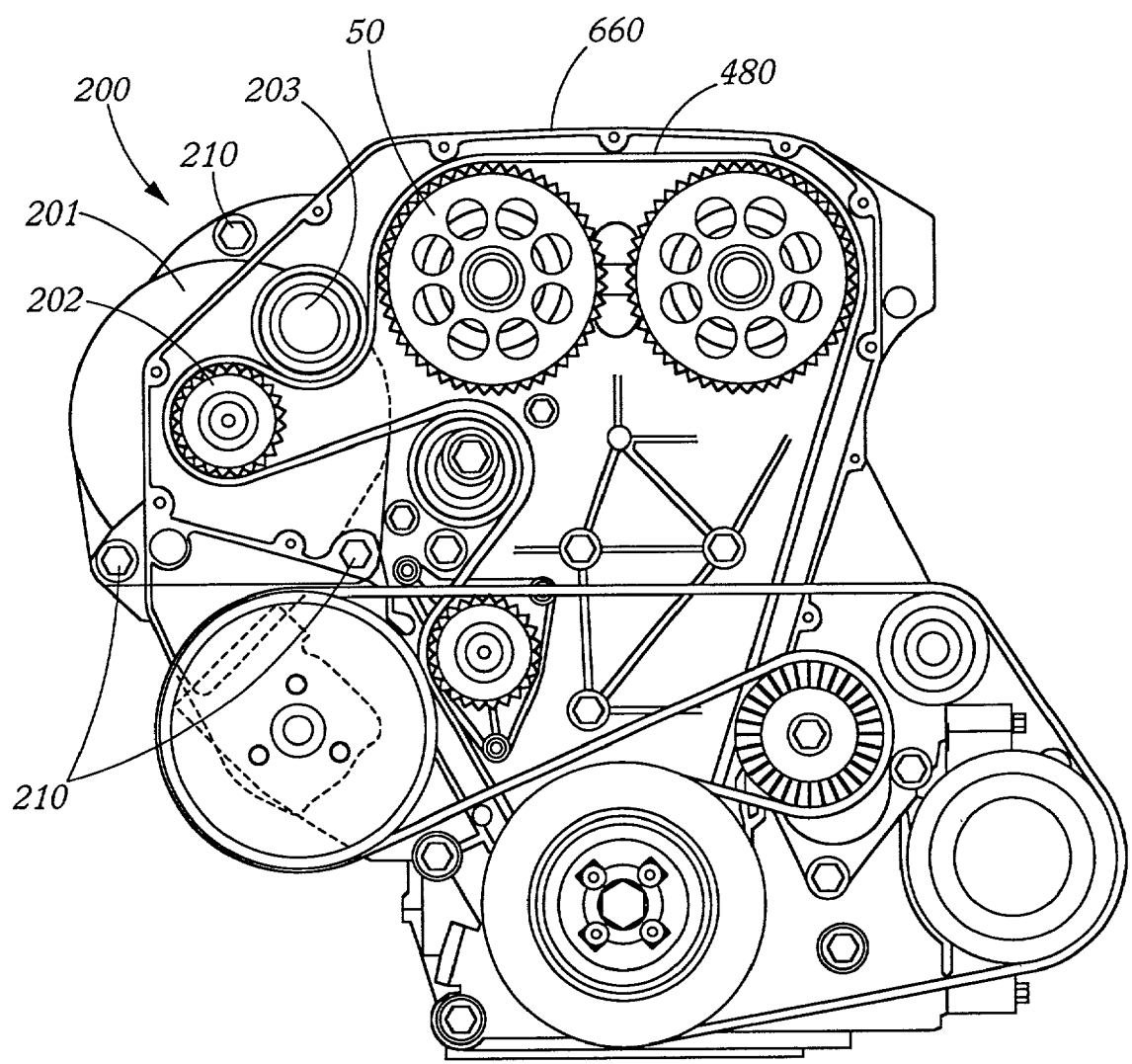
FIG. 14 depicts an alternate embodiment having an alternator-starter driven by a synchronous belt.

FIG. 14 depicts an alternate embodiment having an alternator-starter 201 driven by a synchronous belt 480. In this embodiment, alternator-starter 201 is mounted to frame 640 at mounting point 200 using fasteners 210. Frame 640 is substantially similar to frame 64 as described elsewhere herein, except for the additional alternator-starter mounting point. In addition to alternator-starter 201, this embodiment may also include any combination of alternator-starter 201 with the other accessories as previously described in this specification.

Alternator-starter 201 is driven by synchronous power transmission belt 480. Belt 480 is engaged with alternator-starter sprocket 202. Sprocket 202 has a toothed profile. However, since the alternator-starter operation is in not dependent on engine timing, sprocket 202 may also comprise any other belt profile including multi-ribbed and v-belt, so long as it is compatible with belt 480. Idler pulley 203 is located between camshaft sprocket 50 and sprocket 202. Belt 480 is substantially similar to belt 48, but for the difference in length to accommodate the addition of sprocket 202 and idler pulley 203. The flexible link comprising synchronous power transmission belt 480 may also comprise chain.

In another embodiment, the case of alternator-starter 201 is integrated into frame 640 at mounting point 200. The case of alternator-starter 201 is cast or machined as an integral part of frame 640 at mounting point 200. The parts of alternator-starter 201 including the rotor (not shown) are then assembled into the case in the same manner as if alternator-starter 201 was an independent component. This embodiment further increases the structural integrity of the overall module by eliminating the mechanical joint and attendant fasteners otherwise used to fasten the alternator-starter to mounting point 200. This method of fabricating the component case as an integral part of the drive module frame may also be applied to any of the other accessory components that are attached to the frame including the power assisted steering pump 16, fuel injection pump 301, and air conditioning compressor 14.

In any of the foregoing embodiments alternator-starter 201 is used in two modes. In the first mode, the alternator-starter operates simply as an alternator providing power to various engine electrical components while engine 10 is operating.

In a second mode, alternator-starter 201 operates as a starter. In this second mode engine 10 started in a normal fashion. However, it also can be stopped when it might otherwise operate at idle while consuming fuel and emitting exhaust gases, for example at a stoplight. Then, when it is necessary to start the vehicle, a power source such as a 12V or 42V battery provides power to alternator-starter 201 for operation as a starter motor. By way of example, in response to a throttle input alternator-starter 201 is energized causing belt 480 to be driven by alternator-starter 201, thereby driving the entrained components and turning over engine 10, causing engine 10 to start. Once engine 10 is running, the alternator function is resumed. Unlike the prior art, combining alternator-starter 201 in a single component allows these otherwise separate components to be utilized at a single functional location on the engine. This eliminates the need for a separate starter, usually located on another portion of engine 10 adjacent to a flexplate or flywheel.

Omitting the starter and incorporating the alternator-starter on frame 640 also significantly reduces the materials cost by eliminating a separate starter and the assembly steps associated with installing the starter. It also removes installation of the starter from the engine critical assembly path, since it is then incorporated with the drive module assembly as described herein.

Figure 15:
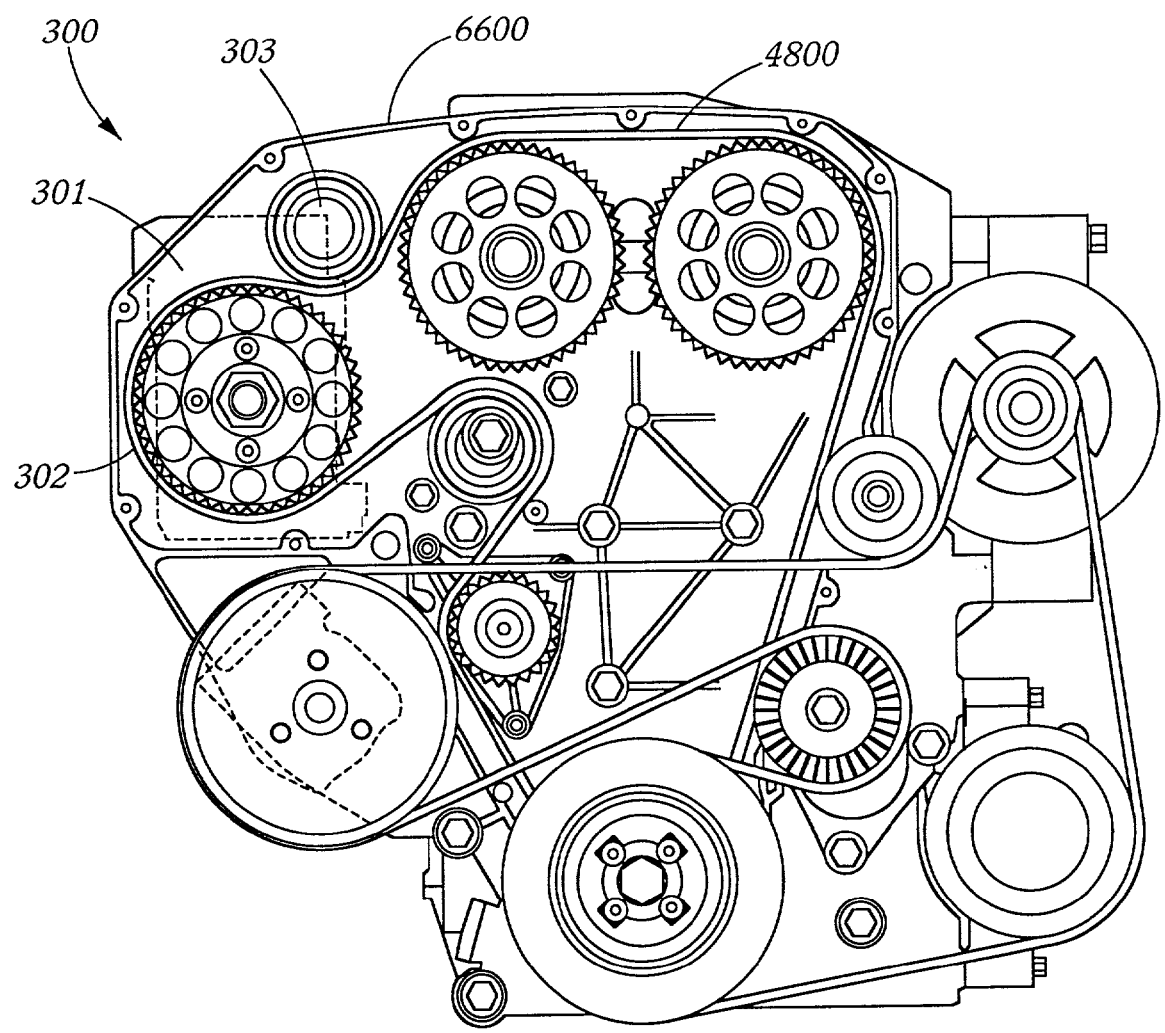
FIG. 15 depicts an alternate embodiment comprising a fuel injection pump component.

FIG. 15 depicts another alternate embodiment including a fuel injection pump component. In this embodiment fuel injection pump 301 is mounted to frame 6400 at location 300. Except for the additional fuel injection pump mounting portion, frame 6400 is substantially similar to frame 64. Fuel injection pump 301 is driven by synchronous power transmission belt 4800. Belt 4800 engages fuel injection pump sprocket 302.

In the case of compression ignition engines using traditional rotary or in-line injection pumps correct fuel injection pump operation is dependant upon engine timing requiring the use of a synchronous belt. In the case of a spark ignition engine or a compression ignition engine fitted with a common rail type fuel injection system correct fuel pump operation may or may not be dependant upon engine timing. In those cases where correct function does not depend upon a synchronous relationship to the crank rotation, sprocket 302 may run on the back (not shown) of belt 4800 which may be any other belt profile including v-ribbed or multi-ribbed and V-belt.

Sprocket 302 has a toothed profile. Idler pulley 303 is located between camshaft sprocket 50 and sprocket 302. Except for the difference in length to accommodate the addition of sprocket 302 and idler pulley 303, belt 4800 is substantially similar to belt 48.

Again, this arrangement eliminates the need to separately place fuel injection pump 301 at another location on engine 10. It also eliminates a separate step to install the fuel injection pump independently of the module. This significantly simplifies overall engine assembly by allowing fuel injection pump 301 to be pre-assembled to the frame 6400 before frame 6400 is connected to engine 10.

Figure 16:
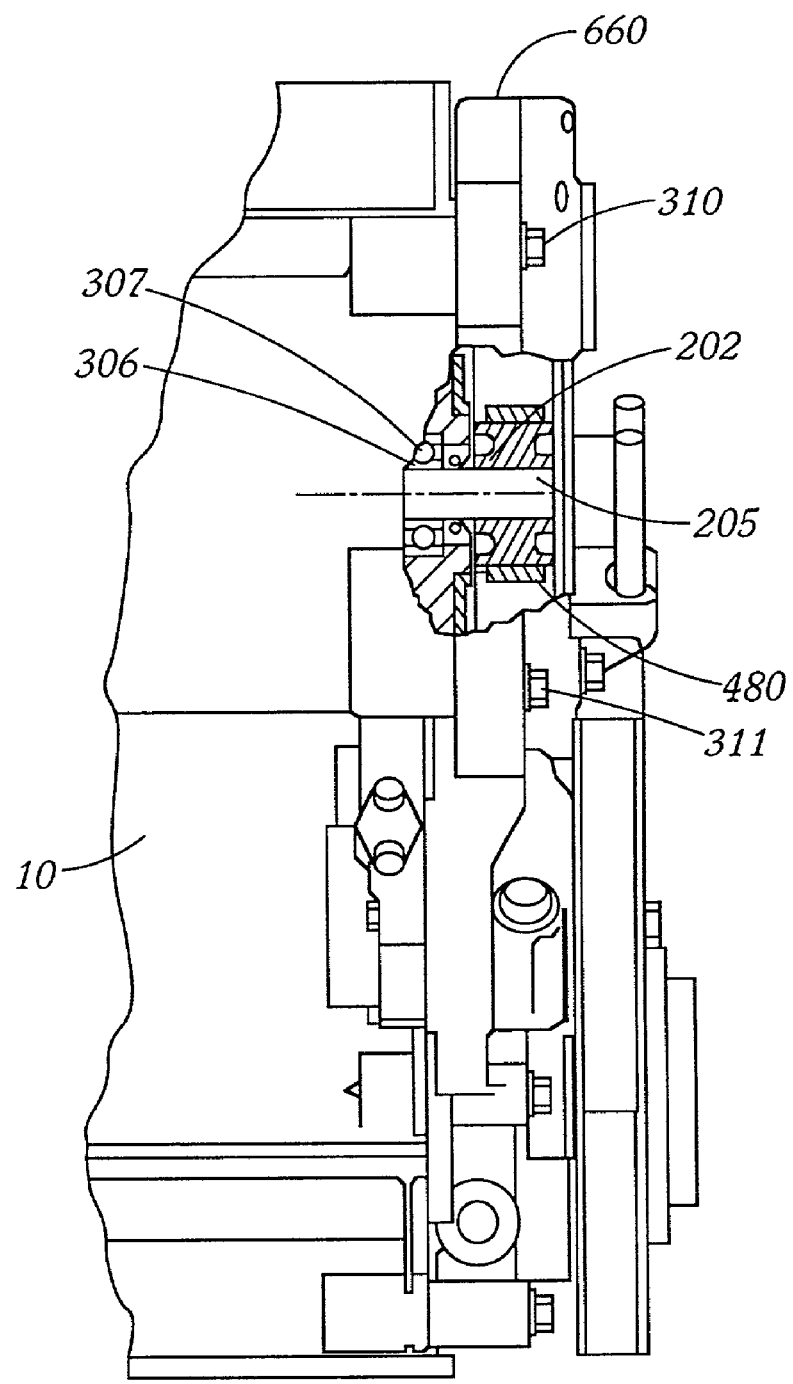
FIG. 16 is a side cross-sectional view of the alternator-starter.

Referring to FIG. 16, sprocket 202 is mounted to shaft 205. Shaft seal 306 prevents contaminants from entering frame 640 along shaft 205. Alternator-starter 201 is attached to frame 640 using fasteners 310, 311 before frame 640 is connected to engine 10 as described elsewhere in this specification. No other structural connections are required between alternator-starter 201 and engine 10. Frame 640 fully supports alternator-starter 201. However, if required, fasteners from alternator-starter 201 to engine 10 other than from frame 64 may be added to further stiffen the assembly.

Figure 17:
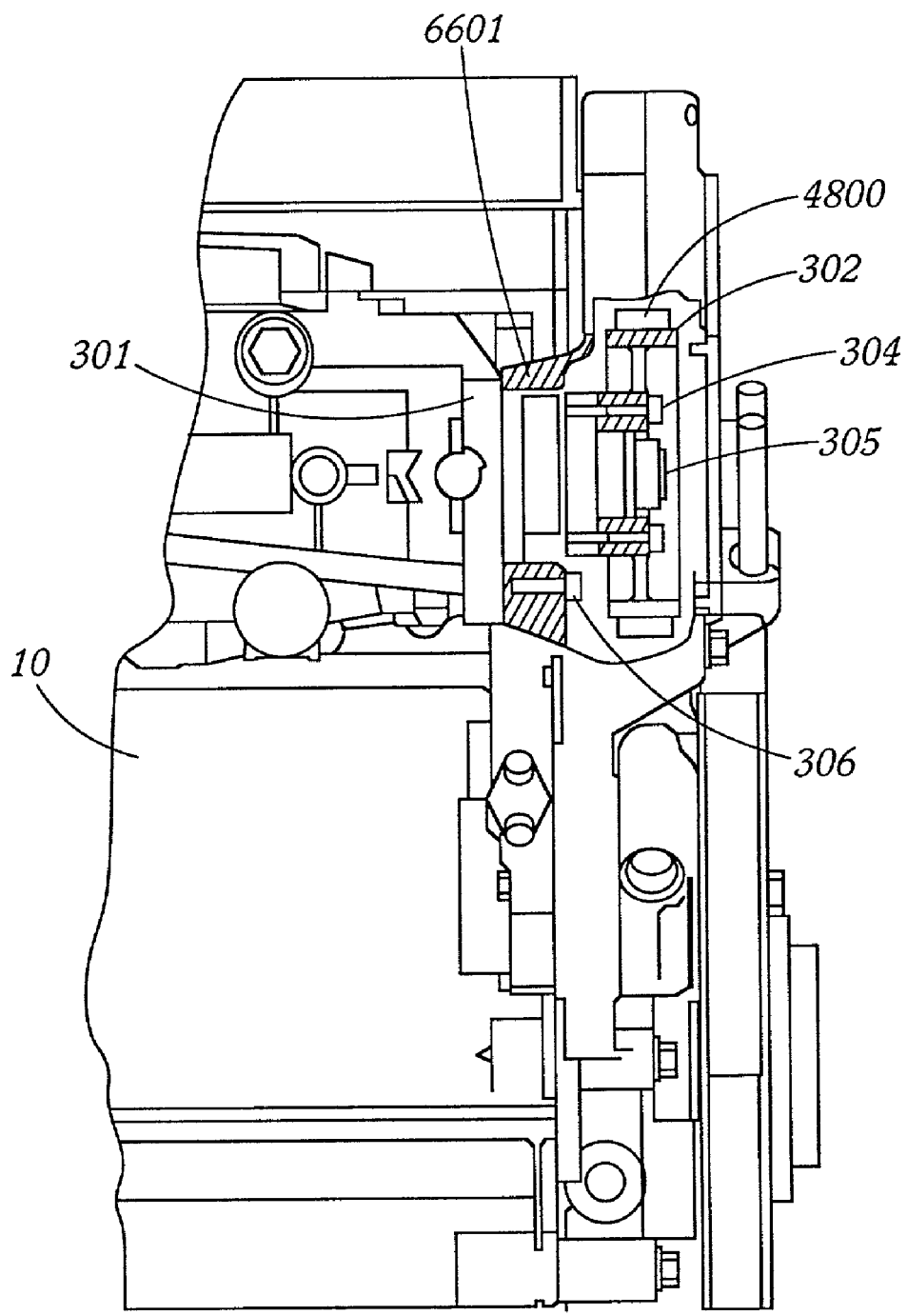
FIG. 17 is a side cross-sectional view of the fuel injection pump.

Referring to FIG. 17, fuel injection pump 301 is connected to frame 6400 at frame boss 6401 using fasteners 306. Pump 301 is connected to frame 6400 before frame 6400 is connected to engine 10. Sprocket 302 is mounted to shaft 305 with fasteners 304. No other structural connections are required between fuel injection pump 301 and engine 10. Frame 6400 fully supports fuel injection pump 301. A fuel line (not shown) runs from the fuel tank to the pump and from the pump to each cylinder (not shown) as may be required by a user. However, if required, fasteners from the fuel injection pump to engine 10 other than from frame 64 may be added to further stiffen the assembly.

Figure 18:
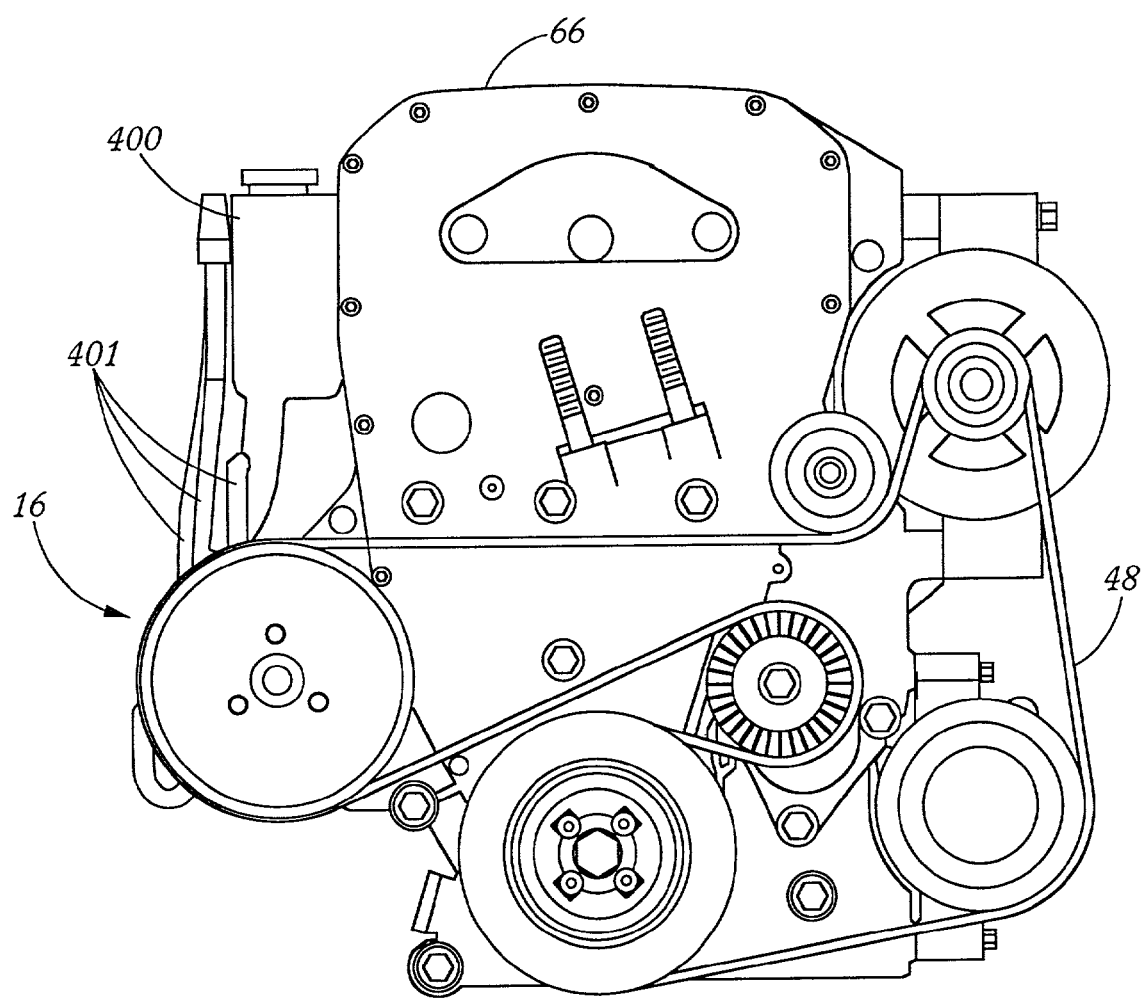
FIG. 18 is a front elevation view showing a power assisted steering pump fluid reservoir.

FIG. 18 depicts reservoir 400 attached to a side of frame 64. Reservoir 400 may be attached to frame 64 using threaded fasteners as well as straps or clips (not shown). Tubes 401 comprise a supply and return fluid path between reservoir 400 and power steering pump 16.

In another alternate embodiment, reservoir 400 may be an integral part of frame 64. During fabrication of frame 64, a cavity (not shown) is made in frame 64 for containing power steering fluid.

Figure 19:
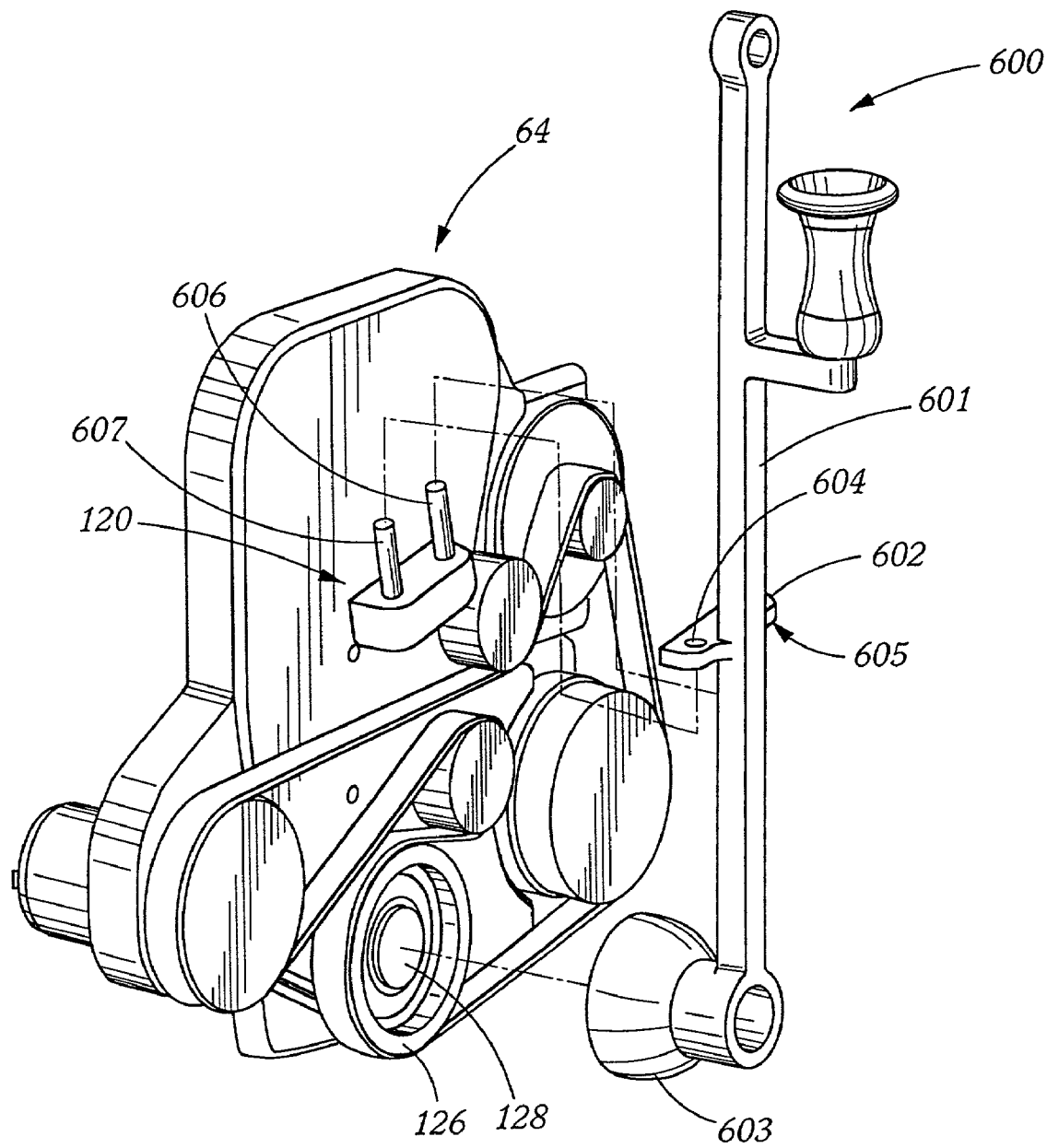
FIG. 19 depicts a perspective view of a lifting frame.

FIG. 19 depicts a perspective view of a lifting frame. A lifting frame is used to lift and otherwise manipulate the drive module during the engine assembly process. Lifting fame 600 includes body 601. Plate 602 is attached to body 601. Plate 602 includes holes 604 and 605 for engaging rods 606, 607 on frame 64. Fixture 603 includes a circular form for engaging a drive-wheel.

In use, lifting frame 600 is first engaged with a crankshaft drive-wheel. Next plate 602 is lifted slightly onto body 601 to allow holes 604 and 605 to engage rods 606 and 607 on motor mounting bracket 120, see FIG. 7. Lifting frame 600 is now properly engaged to lift frame 64 for the assembly process. Frame 600 is removable once assembly is complete.

Figure 20:
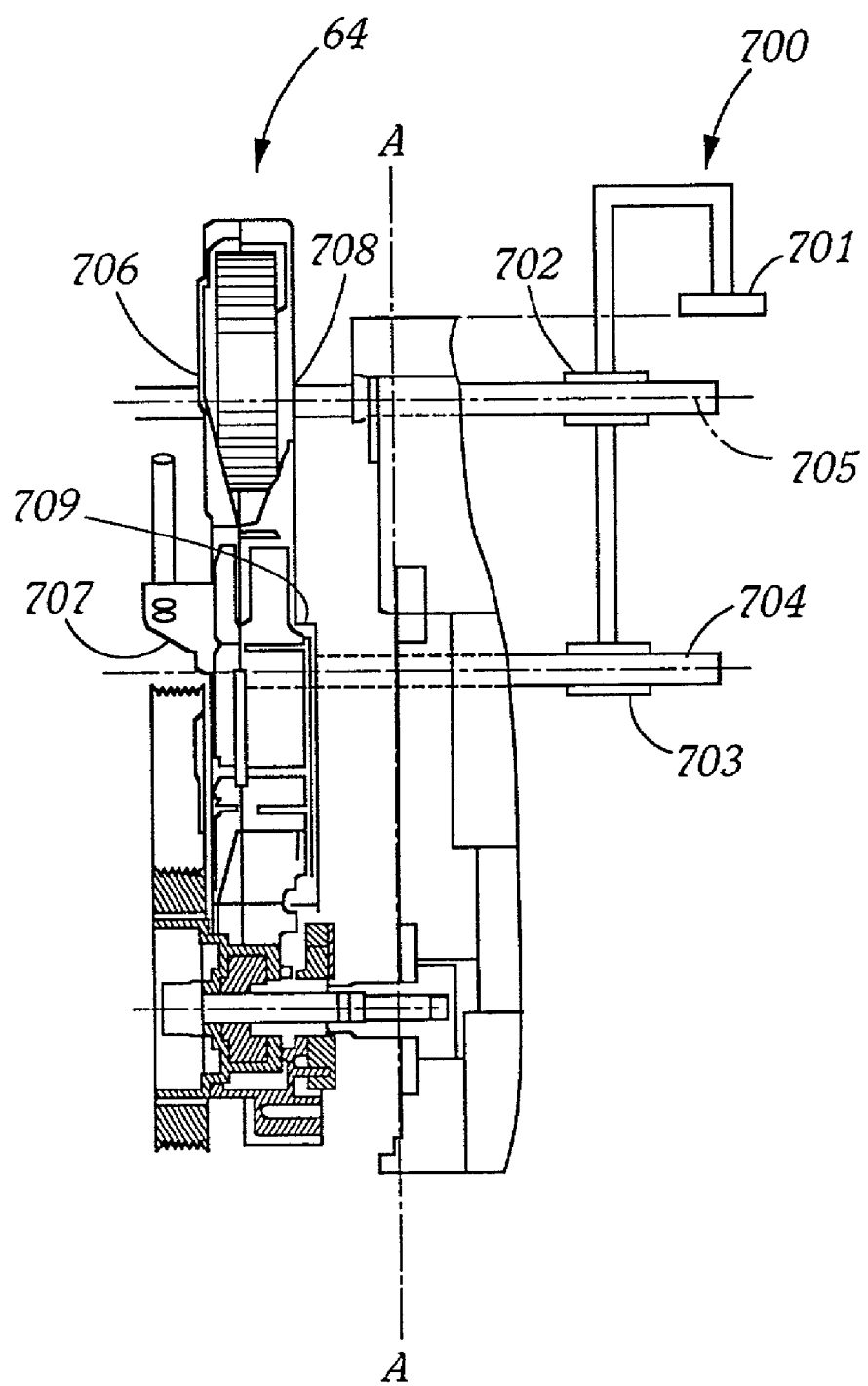
FIG. 20 depicts a side cross-sectional view of the alignment frame for engine assembly.

Referring to FIG. 20, alignment frame 700 includes mounting bracket 701 by which frame 700 is removably attached to an engine. Frame 700 also includes guides 702 and 703 through which rods 704 and 705 are slidingly engaged. Rods 704 and 705 are moveable axially along a major longitudinal axis through guides 702, 703. Ends 706 and 707 of rods 705 and 704 respectively engage corresponding holes 708 and 709 in frame 64.

The assembly process generally includes attaching a drive module to an engine block as part of engine assembly. During operation, an engine block having rotating components develops useable power. The drive module described herein is self-contained and is attached to the engine block. The module receives a portion of the usable power developed by the engine block during operation, generally from a connection to the crankshaft as is more fully described herein. Utilizing a portion of the usable power received from the block, or crankshaft in particular, the module provides such forms of power to the engine as may be required by the engine for operation. This includes electrical power generated by a component on the module as more fully described herein for electrical systems. It also may include fluid power generated by a component on the module for fluid driven systems, such as power steering and as more fully described herein. The fluid power fluid may comprise an incompressible fluid such as water, hydraulic fluid or power steering fluid. It may also comprise a compressible fluid such as air or other compressible gas. The module may also provide mechanical power for driving cooperating engine rotating components, such as mechanically connecting a crankshaft to a camshaft or camshafts, or to such other accessories using a flexible link as more fully described herein.

The module installation process includes attaching frame 700 to an engine. Attachment may be accomplished by use of fasteners or by connection to any form of mounting point or fixture on the engine for receiving frame 700. Rods 704 and 705 are then extended to receive frame 64. Frame 64 is manipulated using lifting frame 600 attached to the motor mounting bracket 120 as shown and described in FIG. 19. Frame 64 is then engaged to rod ends 706, 707 using holes 708, 709 respectively. Frame 64 is then pushed into engagement with an engine front by sliding rods 704, 705 through guides 703, 702 respectively. Rods 704, 705 and holes 703, 702 are set in predetermined positions in order to assure proper alignment of frame 64 with the engine and its components, including the camshaft(s) and crankshaft as described elsewhere in this specification. Frame 64 mounting position is further determined from an engine datum plane A—A to assure proper relationship of the components.

Once frame 64 is in proper position on the engine, lifting frame 600 is removed. Frame 64 is supported by alignment frame rods 704, 705 at this step in the process. Threaded fasteners are then screwed into the engine through frame 64. Once frame 64 is fastened to the engine, rods 704, 705 are retracted from holes 708, 709 and frame 700 is remove from the engine. A fastening device such as a rotary bolt driver may be used to secure the fasteners into the engine. The rotary bolt driver also may engage an end of each rod 706, 707 to assure proper and quick alignment with the fasteners during the assembly process. The drive-wheels are then fastened to their respective shafts as described elsewhere in this specification.

Figure 21:
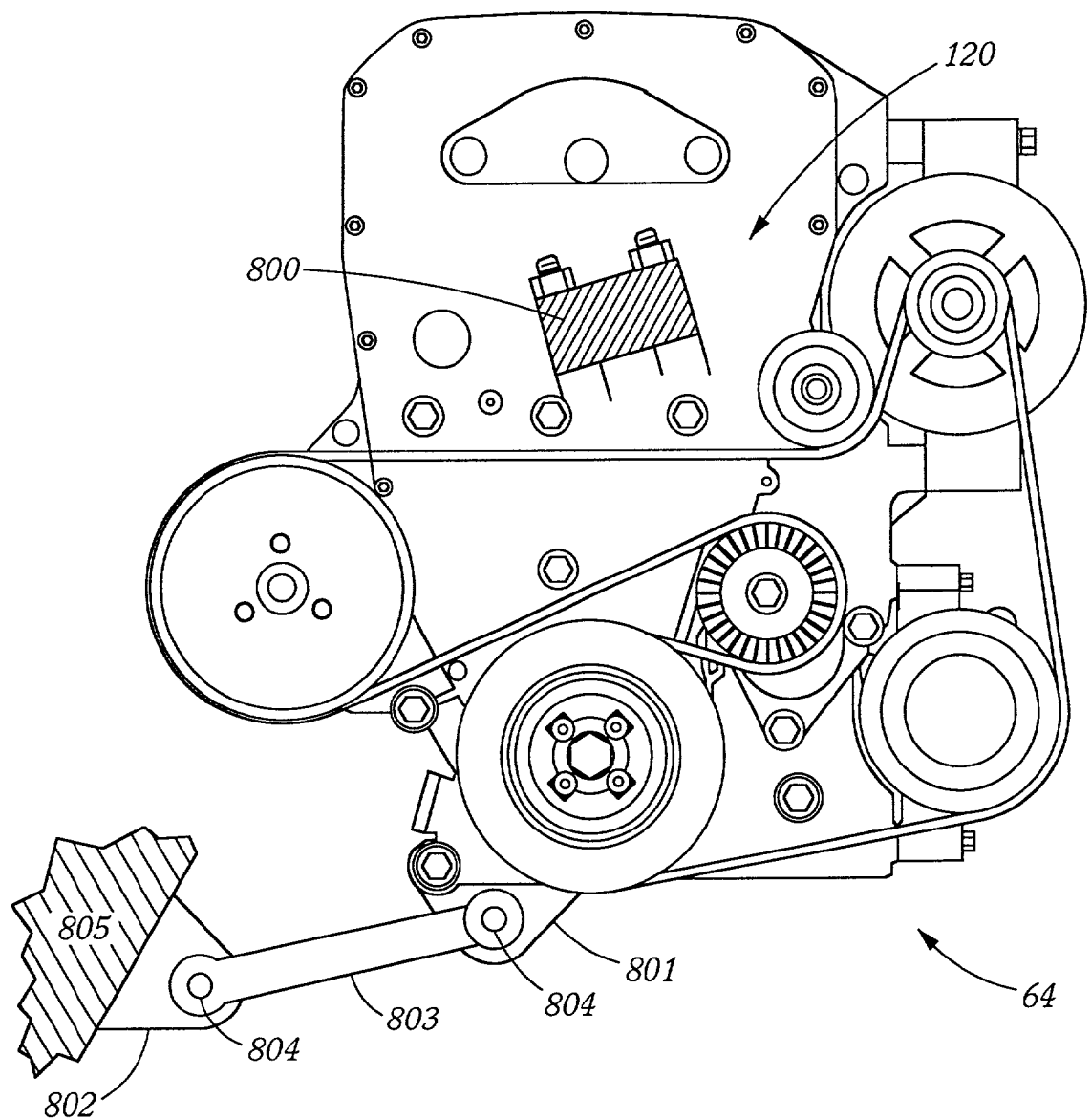
FIG. 21 is a front elevation view of an engine having a drive torque control link.

FIG. 21 is a front elevation view of an engine having a drive torque control link. Mounting bracket 801 is attached to frame 64. Mounting bracket 802 is attached to a vehicle frame 805. Torque link 803 is connected between mounting brackets 801 and 802 using fasteners 804. Fasteners 804 may also comprise rubber bushings (not shown) to reduce engine vibrations that may be otherwise transmitted to the vehicle frame 805 through torque link 803. Mounting bracket 801 is preferably located on frame 64 so as to maximize the distance between mounting bracket 801 and engine mount 800 so that the engine torque is reacted at as great a distance as possible from the engine mount 800. However, the position of mounting brackets 801, 802 may be varied in order to accommodate design requires for a given vehicle configuration.

Figure 22:
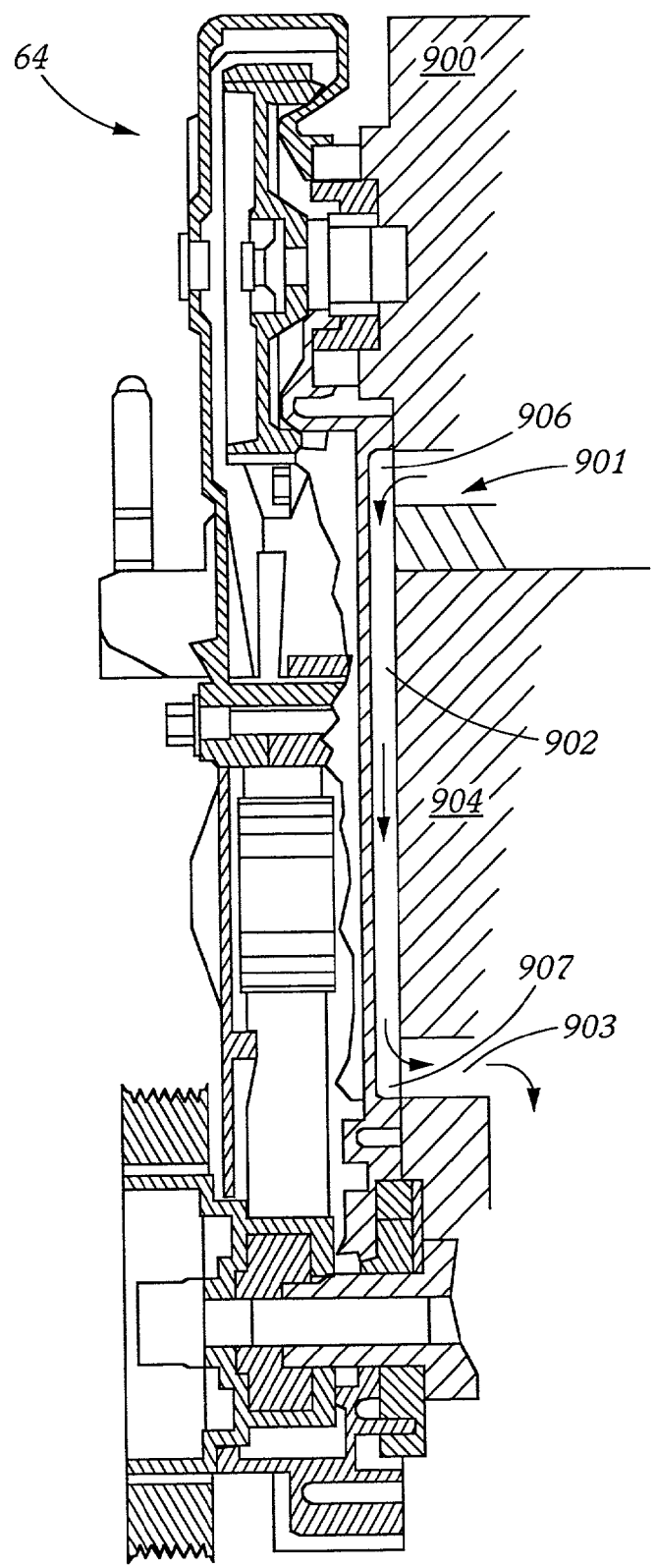
FIG. 22 is a side cross-sectional view of an alternate embodiment including an oil gallery.

FIG. 22 is a side cross-sectional view of an alternate embodiment including an oil gallery. Module frame 64 is shown mounted to the front of engine 10, which includes cylinder head 900 attached to block 904. A portion of frame 64 includes a gallery 902. Gallery 902 provides a fluid connection and passage between the cylinder head and the engine block, for example, to an oil pan attached to the block (not shown). Oil pumped to the cylinder head by the oil pump (not shown) flows through head 900 to the head drain 901. Head drain 901 is connected to gallery 902. Oil flows though gallery 902 to block intake aperture 903. The oil then flows to such portions of the engine as may be connected to the block intake aperture 903. Gallery 902 is sealed to the cylinder head and block to prevent leaks.

Figure 23:
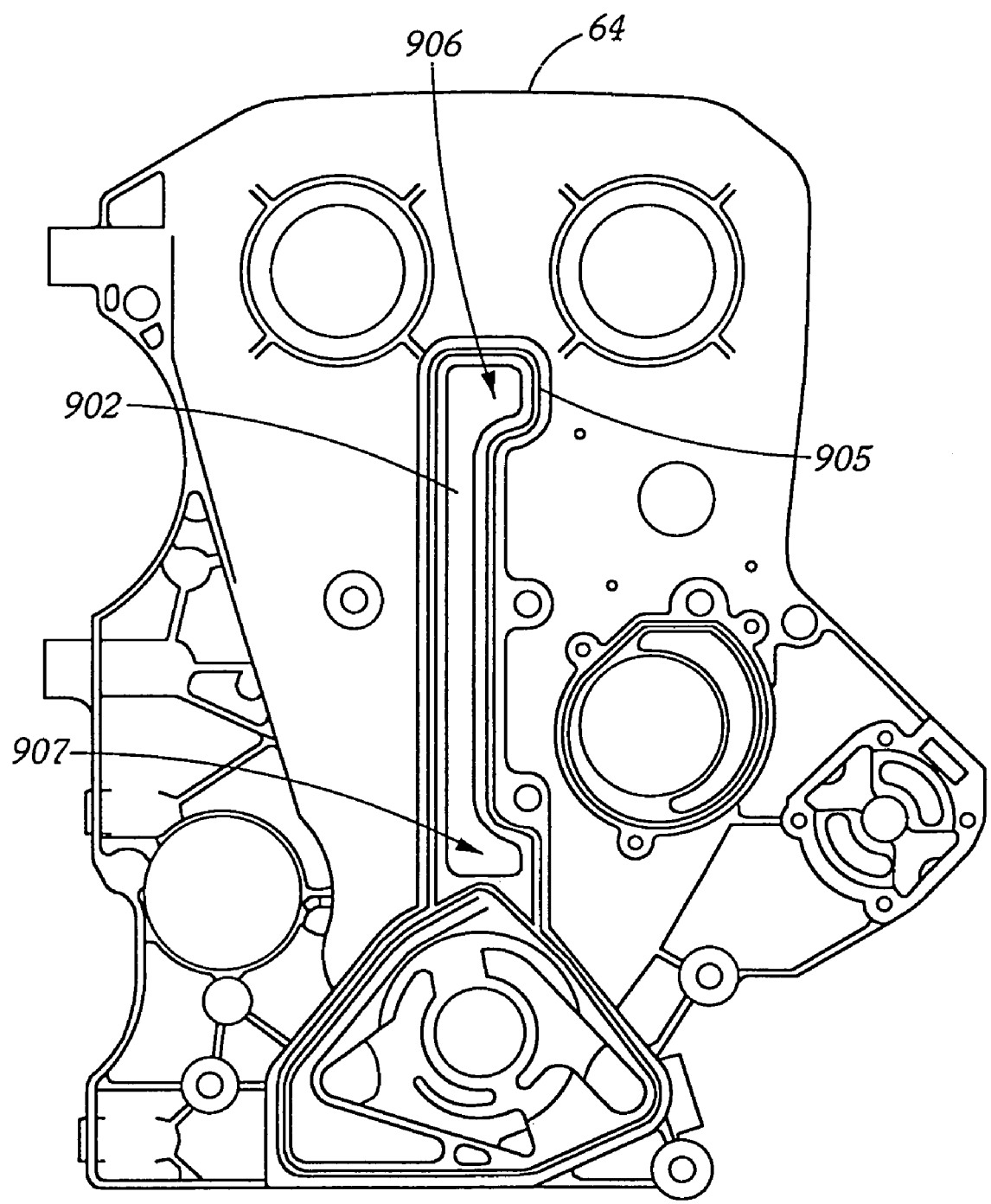
FIG. 23 is a front view of an alternate embodiment including an oil gallery.

FIG. 23 is a front view of an oil gallery. Gallery 902 is shown having a intake area 906 and drain area 907. However, it is also possible for a fluid to enter gallery 902 at area 907 and exit from area 906 depending on the needs of a user. Gasket 905 seals gallery 902 to prevent leakage of the fluid from gallery 902. The form of gallery 902 shown in FIG. 23 is offered by way of example and not of limitation since it is possible to design gallery 902 to have any shape necessary to accommodate a fluid flow between and among various engine components.

Gallery 902 may also serve as an air passage to provide enhanced cooling to the engine and module. In this embodiment, the air gallery allows air to circulate between the module frame and the engine. The gallery allows air to enter from ambient conditions from the module base. The air circulates by convection and exhausts from an outlet (not shown) located on top of the module.

A forced air flow system could also be used to provide a cooling air flow through module gallery 902. In this embodiment, air is forced through the gallery by an airpump or compressor at a rate sufficient to effect cooling of the frame. The gallery configuration is arranged to allow air flow coverage across the module frame sufficient to cool the frame. The gallery may also comprise cooling fins for exposing a maximum surface area to the cooling air flow.

In yet another embodiment gallery 902 is expanded in size to establish an air gap between frame 64 and the engine to which it is attached. This air filled region acts to insulate the frame and the belts it contains from engine heat. Reduction of the module temperature using an insulating layer of air has the effect of increasing the operating life of the belts.

The foregoing description and illustrative embodiments of the present invention have been shown on the drawings and described in detail in varying modifications and alternative embodiments. It should be understood, however, that the foregoing description of the invention is exemplary only, and that the scope of the invention is to be limited only to the claims as interpreted in view of the prior art. Moreover, the invention illustratively disclosed herein suitably may be practiced in the absence of any element which is not specifically disclosed herein.

I claim:

1. An internal combustion engine drive module comprising:
    a drive module frame adapted for mounting upon an internal combustion engine, a synchronous drive releasably mounted upon said frame and adapted for mechanical communication between a camshaft of said internal combustion engine and a crankshaft of said internal combustion engine, and
    a portion of an internal combustion engine accessory drive releasably mounted upon said frame, said accessory drive adapted to transmit power between an internal combustion engine accessory and said crankshaft of said internal combustion engine.

2. The drive module of claim 1 further comprising:
    said engine accessory mounted upon said drive module frame, a drive-wheel mounted upon a shaft of said engine accessory, and
    said drive-wheel being in mechanical communication with said internal combustion engine accessory drive.

3. An internal combustion engine drive module comprising:
    a drive module frame adapted for mounting upon an internal combustion engine, a synchronous drive, including a camshaft sprocket, a crankshaft drive-wheel, and a flexible link power transmission member spanning between said camshaft sprocket and said crankshaft drive-wheel, wherein said camshaft sprocket and said crankshaft drive-wheel are each rotatably mounted upon said drive module frame, said camshaft sprocket being adapted to matingly engage a camshaft of an internal combustion engine, and said crankshaft sprocket adapted to matingly engage a crankshaft of said internal combustion engine, and
    an internal combustion engine accessory drive mounted upon said frame and adapted to transmit power between an internal combustion engine accessory and said crankshaft of said internal combustion engine.

4. A method of assembling an engine comprising:
providing a drive module frame;
attaching a removable alignment frame having at least one extendable rod to an engine;
extending said extendable rod thereby engaging a receiving hole on said drive module frame;
moving said drive module frame by a sliding movement of said rod into aligned engagement with said engine;
connecting said drive module frame to said engine using a fastener;
connecting a drive module frame drive-wheel to a drive-wheel shaft; and
removing said removable alignment frame.

5. The method as in claim 4 further comprising:
engaging a fastening machine simultaneously with a drive module frame fastener and said extendable rod.

6. The method as in claim 5 further comprising:
connecting said drive module frame to said engine using a threaded fastener.

7. The method as in claim 4 further comprising:
moving said drive module frame to engagement with said rod using a removable lift frame.

8. The method as in claim 4 further comprising:
connecting a drive module frame drive-wheel to an engine camshaft.

9. The method as in claim 4 further comprising:
removing an alignment clip from a drive module frame drive-wheel.

* * * * *